(12) United States Patent
Itoh et al.

(10) Patent No.: US 8,525,064 B2
(45) Date of Patent: Sep. 3, 2013

(54) ELECTRIC DISCHARGE MACHINE AND METHOD OF PRODUCING NOZZLE BODY USING THE SAME

(75) Inventors: Akira Itoh, Kariya (JP); Yasuji Inobe, Nagoya (JP); Hiroshi Adachi, Kariya (JP); Takeshi Oochi, Miyoshi (JP); Kazuhisa Ikuta, Toyota (JP); Michio Kameyama, Toyota (JP)

(73) Assignee: Denso Corporation, Kariya (JP)

( * ) Notice: Subject to any disclaimer, the term of this patent is extended or adjusted under 35 U.S.C. 154(b) by 266 days.

(21) Appl. No.: 12/943,092

(22) Filed: Nov. 10, 2010

(65) Prior Publication Data

US 2011/0186551 A1  Aug. 4, 2011

(30) Foreign Application Priority Data

Nov. 12, 2009 (JP) ................................. 2009-258785
Nov. 16, 2009 (JP) ................................. 2009-260801

(51) Int. Cl.
*B23H 1/02* (2006.01)
*B23H 9/10* (2006.01)
*B23H 9/14* (2006.01)

(52) U.S. Cl.
USPC ..................... 219/69.13; 219/69.17; 219/69.2

(58) Field of Classification Search
USPC ....... 219/69.13, 69.15, 69.17, 69.2; 205/651, 205/665, 686
See application file for complete search history.

(56) References Cited

U.S. PATENT DOCUMENTS

| | | | | |
|---|---|---|---|---|
| 2,778,925 A * | 1/1957 | Gross et al. | ................. | 219/69.15 |
| 3,348,015 A * | 10/1967 | Vors et al. | ................... | 219/69.13 |
| 3,467,807 A * | 9/1969 | Livshits et al. | ............ | 219/69.13 |
| 3,492,530 A * | 1/1970 | Tadini et al. | ................ | 219/69.13 |
| 3,558,998 A * | 1/1971 | Bertolasi | ..................... | 219/69.13 |
| 3,775,580 A * | 11/1973 | Scherbaum | ................ | 219/69.15 |
| 4,441,004 A * | 4/1984 | Inoue | .......................... | 219/69.15 |
| 4,510,365 A * | 4/1985 | MacGregor et al. | ........ | 219/69.16 |
| 5,453,653 A | 9/1995 | Zumeris | | |
| 6,369,343 B1 * | 4/2002 | Krenz et al. | .................. | 219/69.2 |
| 6,373,018 B1 | 4/2002 | Wei et al. | | |
| 6,548,028 B1 | 4/2003 | Yuzawa et al. | | |
| 6,563,071 B2 * | 5/2003 | Krenz | ......................... | 219/69.13 |

FOREIGN PATENT DOCUMENTS

| | | |
|---|---|---|
| JP | 53-107797 | 9/1978 |
| JP | 54-121499 | 9/1979 |
| JP | 63-272421 | 11/1988 |
| JP | 64-2829 | 1/1989 |
| JP | 64-2830 | 1/1989 |
| JP | 3-79237 | 4/1991 |
| JP | 4-30918 | 2/1992 |
| JP | 5-104332 | 4/1993 |

(Continued)

OTHER PUBLICATIONS

Machine translation of Japan Patent document No. 06-226,538-A, Jan. 2013.*
Machine translation of Japan Patent document No. 07-024,647-A, Jan. 1995.*
Machine translation of Japan Patent document No. 08-118,157-A, May 1996.*

(Continued)

*Primary Examiner* — Geoffrey S Evans
(74) *Attorney, Agent, or Firm* — Nixon & Vanderhye PC

(57) ABSTRACT

An electric discharge machine to process a work piece includes a plurality of electrodes, and a plurality of discharge power supply units. The plurality of electrodes generate a plurality of discharges with the work piece, respectively. The plurality of discharge power supply units apply voltages for the plurality of electrodes, respectively and independently.

8 Claims, 14 Drawing Sheets

(56) References Cited

FOREIGN PATENT DOCUMENTS

| JP | 06-226538 A | * | 8/1994 |
|----|-------------|---|--------|
| JP | 07-024647 A | * | 1/1995 |
| JP | 08-118157 A | * | 5/1996 |
| JP | 9-85536 | | 3/1997 |
| JP | 11-170119 | | 6/1999 |
| JP | 2000-167717 | | 6/2000 |
| JP | 2002-292522 | | 10/2002 |
| JP | 2002-292522 A | * | 10/2002 |
| JP | P2007-330036 A | | 12/2007 |
| JP | P2008-54407 A | | 3/2008 |
| JP | 2008-254117 | | 10/2008 |

OTHER PUBLICATIONS

Machine translation of Japan Patent document No. 2002-292,522-A, Oct. 2002.*
Japanese Office Action dated Jul. 3, 2012, issued in corresponding Japanese Application No. 2009-260801, with English translation.
Japanese Office Action dated Oct. 18, 2011, issued in corresponding Japanese Application No. 2009-258785, with English translation.
Japanese Office Action dated Oct. 18, 2011, issued in corresponding Japanese Application No. 2009-260801, with English translation.

* cited by examiner

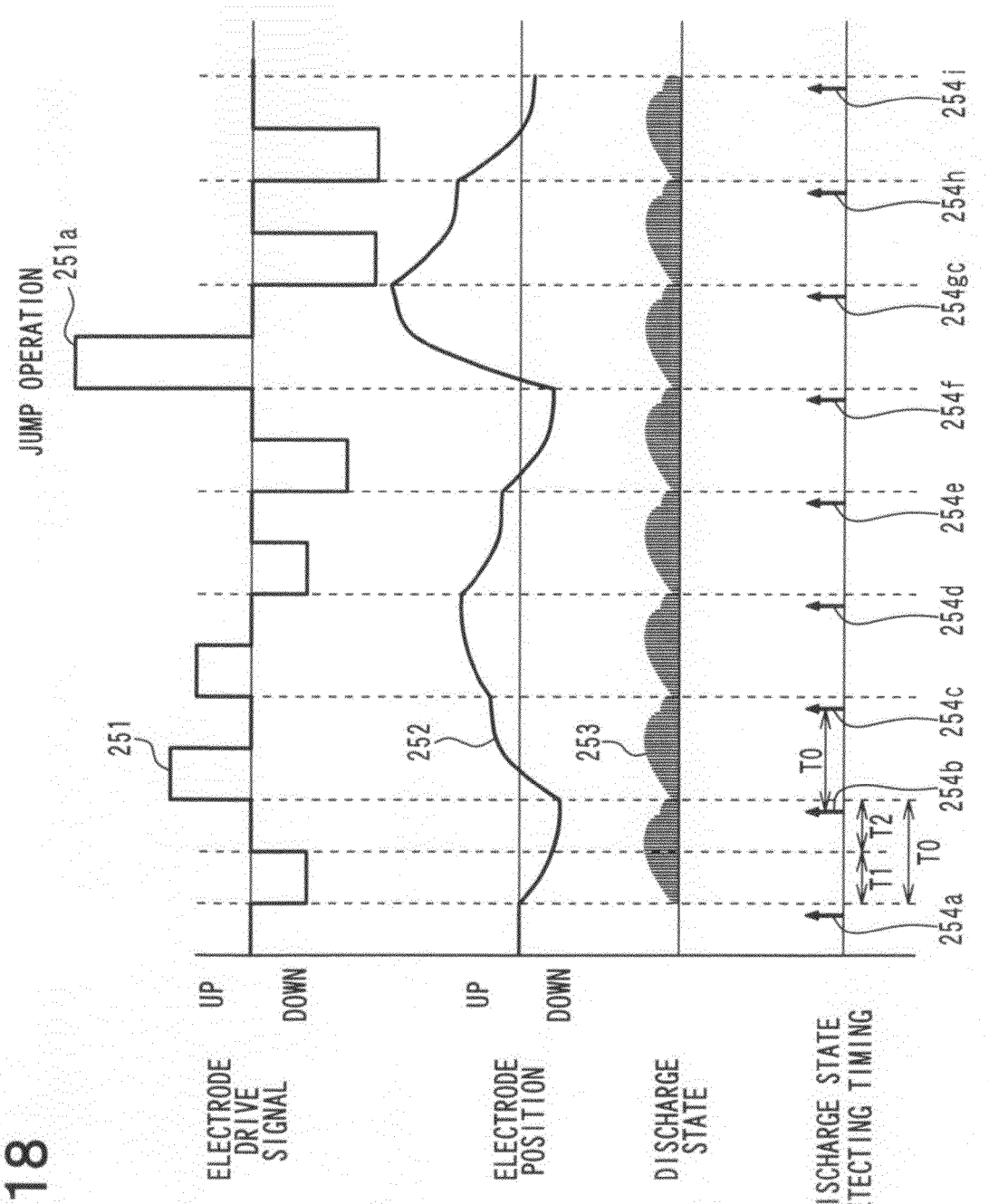

ELECTRIC DISCHARGE MACHINE AND METHOD OF PRODUCING NOZZLE BODY USING THE SAME

CROSS REFERENCE TO RELATED APPLICATION

This application is based on Japanese Patent Application No. 2009-258785 filed on Nov. 12, 2009 and Japanese Patent Application No. 2009-260801-filed on Nov. 16, 2009, the disclosures of which are incorporated herein by reference in their entirety.

BACKGROUND

The present invention relates to an electric discharge machine and a method of producing a nozzle body using the electric discharge machine.

Discharge is generated by applying voltage between an electrode and a work piece, thereby a hole is formed in the work piece. JP-A-H9-85536 or JP-A-2001-259933 describes such a technology for forming plural holes in a work piece by a single processing operation. Specifically, plural electrodes are moved toward the work piece, and pulse voltages are periodically impressed to the electrodes, at the same time.

However, in this case, discharge usually occurs between only one electrode and the work piece based on the timings of impressing the pulse voltages. Even if voltage is simultaneously impressed to all the electrodes, discharge occurs first between one best-conditioned electrode and the work piece, because electric states between the electrodes and the work piece are different from each other. Once discharge occurs between a certain electrode and the work piece, discharge does not occur between other electrodes and the work piece. It takes a long time to form all the holes in this situation.

JP-A-H5-104332 or JP-A-2000-167717 describes an electric discharge processing, in which a position of an electrode is controlled by a motor so as to produce an optimal discharge between the electrode and a work piece. An electric discharge machine has a discharge state detector circuit to detect a discharge state such as discharge voltage or discharge current between the electrode and the work piece. A first feedback control is performed for determining a movement amount of the electrode in accordance with a detection signal output from the discharge state detector circuit. The machine further has a position detector circuit to detect a position of the electrode using a rotary encoder, for example, so as to accurately realize the movement amount. A second feedback control is performed for controlling the motor based on a detection signal output from the position detector circuit.

However, the first feedback control is not sufficiently accurate, because the electrode may still being controlled by the motor at a timing when the discharge state is detected. Even if the movement amount is set using the discharge state detected at the old timing in such case, the position of the electrode is further moved at a new timing when the movement amount is indicated to the electrode. Therefore, the second feedback control is necessary because the accuracy of the first feedback control is not enough.

SUMMARY OF THE INVENTION

In view of the foregoing and other problems, it is a first object of the present invention to provide an electric discharge machine having plural electrodes so as to process plural holes in a work piece by a single processing operation, thereby the processing time is shortened.

It is a second object of the present invention to provide an electric discharge machine having a motor to perform a position control of an electrode so as to generate an optimal discharge between the electrode and a work piece, thereby a feedback control accuracy is improved for the electrode position using a discharge state between the electrode and the work piece.

As an example to achieve the object, an electric discharge machine to process a work piece includes a plurality of electrodes, and a plurality of discharge power supply units. A discharge is generated between each of the plurality of electrodes and the work piece so as to process the work piece. The plurality of discharge power supply units apply voltages for the plurality of electrodes, respectively and independently.

Discharges are generated between all tip ends of the electrodes and the work piece, respectively, if timings of impressing voltages from the power supply units are coincident with each other or not, because the voltages are independently applied to the electrodes from the power supply units different from each other. Even if the voltage-applying timings are coincident with each other, discharges are generated between all the electrodes and the work piece, respectively, so that the processing time can be shortened.

For example, the electric discharge machine may further include a plurality of discharge head units, and a plurality of power feeding lines. Each of the plurality of discharge head units has a drive mechanism to hold the corresponding one electrode and to change a position of the corresponding electrode, and has a conduction medium portion to electrically connect one of the discharge power supply units to the corresponding electrode. Each of the plurality of feeding lines electrically connects one of the conduction medium portions of the discharge head units to the corresponding discharge power supply unit. The plurality of feeding lines have dimensions equal with each other.

Therefore, impedance is approximately uniform among the feeding lines, so that electrical properties of the discharges between the electrodes and the work piece are made equal with each other. Thus, the electric discharge processing can be stabilized, and noise can be reduced.

For example, the electric discharge machine may further include a plurality of discharge head units, and a plurality of power feeding lines. Each of the plurality of discharge head units has a drive mechanism to hold the corresponding one electrode and to change a position of the corresponding electrode, and has a conduction medium portion to electrically connect one of the discharge power supply units to the corresponding electrode. Each of the feeding lines electrically connects a connection terminal of the conduction medium portion of the discharge head unit to a feeding terminal of the corresponding discharge power supply unit. The feeding terminal and the connection terminal corresponding with each other, and the work piece are arranged on a straight line when seen from one direction of the electric discharge machine.

Therefore, the discharge head units and the corresponding discharge power supply units are located in radial state centering on the position of the work piece, so that electric interference can be reduced among the feeding lines and that electric noise can be reduced at the time of electric discharge processing, compared with the other case.

For example, the electric discharge machine may further include a plurality of discharge head units, and a plurality of power feeding lines. Each of the plurality of discharge head units has a drive mechanism to hold the corresponding one electrode and to change a position of the corresponding electrode, and has a conduction medium portion to electrically connect one of the discharge power supply units to the corresponding electrode. Each of the feeding lines electrically connects a connection terminal of the conduction medium portion of the discharge head unit to a feeding terminal of the corresponding discharge power supply unit. The connection terminals of the discharge head units are arranged in equal intervals on a first circumference line centering on a position of the work piece when seen from one direction of the electric discharge machine. The feeding terminals of the discharge power supply units are arranged in equal intervals on a second circumference line centering on the position of the work piece when seen from the one direction of the electric discharge machine. The second circumference line is larger than the first circumference line.

Therefore, all of angle clearances between adjacent radiation arrangements from the connection terminals to the corresponding feeding terminals are equal with each other. Thus, the feeding lines also have radiation arrangement centering on the position of the work piece, so that all of angle clearances between adjacent radiation arrangements of the feeding lines are almost equal with each other.

Because the position arrangement of the feeding lines is symmetrical relative to a center corresponding to the position of the work holder, influence of electric mutual interference is equally generated among the feeding lines. Therefore, electrical properties of the electrodes are equalized with each other at the time of electric discharge processing, so that the electric discharge processing can be stabilized, and that noise generation can be reduced.

For example, the electric discharge machine may further include a plurality of discharge head units. Each of the discharge head units has a drive mechanism to hold the corresponding one electrode and to change a position of the corresponding electrode, and has a conduction medium portion to electrically connect one of the discharge power supply units to the corresponding electrode. Each of the electrodes has a contact point contact with the conduction medium portion of the corresponding discharge head unit, and distances from the contact points to ends of the electrodes adjacent to the work piece are approximately equal with each other.

Therefore, dimensions of the electrodes extending from the connection terminal toward the work piece become approximately uniform, so that impedances are approximately uniform among the electrodes. Thus, the electric discharge processing can be stabilized, and noise can be reduced.

For example, the electric discharge machine may further include a plurality of discharge head units. Each of the discharge head units has a drive mechanism to hold the corresponding one electrode and to change a position of the corresponding electrode. The discharge head units are arranged outside of a circle when seen from a top side. The circle is defined to center on a position of the work piece and to have a radius corresponding to a distance from a hole to be processed in the work piece to the center when seen from one direction of the electric discharge machine.

Therefore, an area for arranging the head units can be made larger, and the head units can be placed in a state sufficiently separated from each other. Thus, electric noise can be reduced at the time of electric discharge processing.

For example, the electric discharge machine may further include a plurality of discharge head units, and a plurality of electrode guides. Each of the discharge head units has a drive mechanism to hold the corresponding one electrode and to change a position of the corresponding electrode in a direction of a drive axis. Each of the electrode guides is a hollow bar portion to guide a movement of the corresponding electrode. The drive axis of the drive mechanism of the discharge head unit, an axis of the corresponding electrode, and an axis of the corresponding electrode guide are coincident with each other.

Therefore, after the work piece is arranged at a predetermined position, injection holes can be processed in the work piece by straightly displacing the electrodes along the drive axes. Thus, the electrodes can be supplied in stabilized state.

For example, the electric discharge machine may further include a plurality of discharge head units. Each of the discharge head units has a drive mechanism to hold the corresponding one electrode and to change a position of the corresponding electrode. The drive mechanism has an ultrasonic motor to drive the corresponding electrode.

Therefore, a size of the discharge head unit can be made smaller because the ultrasonic motor is used for driving the electrode.

For example, the electric discharge machine may further include a signal transmitter to send signals to the plurality of discharge power supply units. The signals indicate the plurality of discharge power supply units to apply voltages to the plurality of electrodes, respectively, at the same timing. The signal transmitter causes the plurality of discharges to be simultaneously generated between the plurality of electrodes and the work piece.

Therefore, noise of the discharges can be reduced in a case where the discharges are generated at the same timing, compared with a case where the discharges are generated at different timings.

For example, the electric discharge machine may further include a controller to stop one of the electrodes from moving when the one of the electrodes penetrates the work piece.

Therefore, the electrodes penetrating the work piece can be prevented from further moving toward the work piece. Thus, the electrodes can be prevented from physically interfering with each other after the penetration of the work piece.

Further, as an example of the present invention, a method of producing a nozzle body of a fuel injection nozzle includes an arranging of a work piece to be processed into the nozzle body on the electric discharge machine, and a processing of a plurality of injection holes in the work piece using the electric discharge machine.

Thus, the electric discharge machine of the present invention is suitable for producing the nozzle body having the plural injection holes.

As an example to achieve the object, an electric discharge machine to process a work piece through fusion generated by discharge includes an electrode holder, a motor, a discharge state detecting circuit and a controlling circuit. The discharge is generated by applying voltage between an electrode and the work piece, and the electrode holder holds the electrode. The motor displaces the electrode holder in a drive direction. The discharge state detecting circuit detects a discharge state between the electrode and the work piece, and outputs the detection result as a discharge state signal. The controlling circuit receives the discharge state signal from the discharge state detecting circuit, and, controls a position of the electrode in the drive direction by driving the motor based on the discharge state signal. The controlling circuit detects the discharge state between the electrode and the work piece based on the discharge state signal at a timing after the motor is stopped and before the motor is restarted by intermittently activating the motor, and controls the next operation of the motor based on the detected discharge state.

Therefore, the discharge state is detected at a timing that the motor to drive the electrode is not operating, that is when the moving speed of the electrode becomes smaller by inertia. Thus, the discharge state between the electrode and the work piece is detected when the electrode is located near a position where the single movement of the electrode is finished (or is located at a position itself where the single movement of the electrode is finished).

The discharge state detected in such a position is very desirable for a feedback control of the next operation of the motor, because the electrode will be further moved before the next operation if the discharge state is detected while the motor continues operating. In this case, accuracy of the discharge state is low as a feedback value.

Thus, the timing of detecting the discharge state is set after the output of the electrode drive signal is finished to stop the operation of the motor, and is set before an output of the following drive signal is started to restart the operation of the motor, thereby accuracy of the feedback control of the electrode using the discharge state becomes high.

For example, the motor is disabled to receive a feedback control while the motor is activated by the controlling circuit. The feedback control includes a detection of the position of the electrode and a feedback of the detected position into the next operation of the motor.

Thus, accuracy of the position control of the electrode can be made high. In a conventional motor-controlling technology, a first feedback control is performed to set a movement amount of the electrode based on the discharge state, and a second feedback control is performed to detect an actual position of the electrode using a rotary encoder, for example, so as to accurately realize the movement amount. However, the second feedback control becomes unnecessary according to the present invention.

The motor is directly controlled without the second feedback control by eliminating a concept for controlling the position of the electrode. Therefore, the position of the electrode is quickly controlled, so that a time necessary for the electric discharge processing is shortened.

For example, the controlling circuit outputs an electrode drive signal to drive the electrode based on the discharge state signal output from the discharge state detecting circuit. The motor moves the electrode holder only while the controlling circuit outputs the electrode drive signal, and moves the electrode holder with higher speed as a level of the output electrode drive signal is higher. The controlling circuit detects the discharge state between the electrode and the work piece at a timing after an output of a first electrode drive signal is finished and before an output of a second electrode drive signal is started by intermittently outputting the discharge state signals, and sets a level or output time of the second electrode drive signal based on the detected discharge state.

The position of the electrode is controlled by controlling the level of the electrode drive signal. Therefore, the controlling can be performed with higher speed, compared with the other case.

For example, the motor is an ultrasonic motor having a finger chip to have a circular movement, and moves the electrode holder in a state that the finger chip is contact with the electrode holder.

Therefore, it is not necessary to move a moving unit of a motor with the electrode holder like a conventional motor (for example, linear motor) using change of magnetic field. That is, the ultrasonic motor does not have a secondary moving unit of a motor (namely, component to move with the electrode holder in the motor). In other words, a mass of the secondary side moving, unit will, be zero. Therefore, a mass of the electrode holder can be reduced, so that high-speed movement and high-speed control are realizable for the electrode.

For example, the electrode holder has a section contact with the finger chip, and the section directly holds the electrode. Therefore, the electrode holder can be made light compared with the other case.

For example, the controlling circuit detects the discharge state at a timing that a predetermined time is elapsed after the motor is stopped, and the predetermined time is equal to or longer than ½ of a period defined to start when the motor is stopped and to end when the motor is restarted.

The electrode can be sufficiently decelerated as the predetermined time is made longer. Thus, the feedback control of the electrode position has high accuracy.

For example, a method of producing a nozzle body of a fuel injection nozzle includes an arranging of a work piece to be processed into the nozzle body on the electric discharge machine, and a processing of a plurality of injection holes in the work piece using the electric discharge machine. Thus, the electric discharge machine of the present invention is suitable for producing the nozzle body having minute injection holes.

BRIEF DESCRIPTION OF THE DRAWINGS

FIG. 18 is a timing chart illustrating an electrode drive signal, an electrode position, a discharge state and a discharge state detecting timing at a time of electric discharge processing.

DETAILED DESCRIPTION OF PREFERRED EMBODIMENT

First Embodiment

Figure 1:
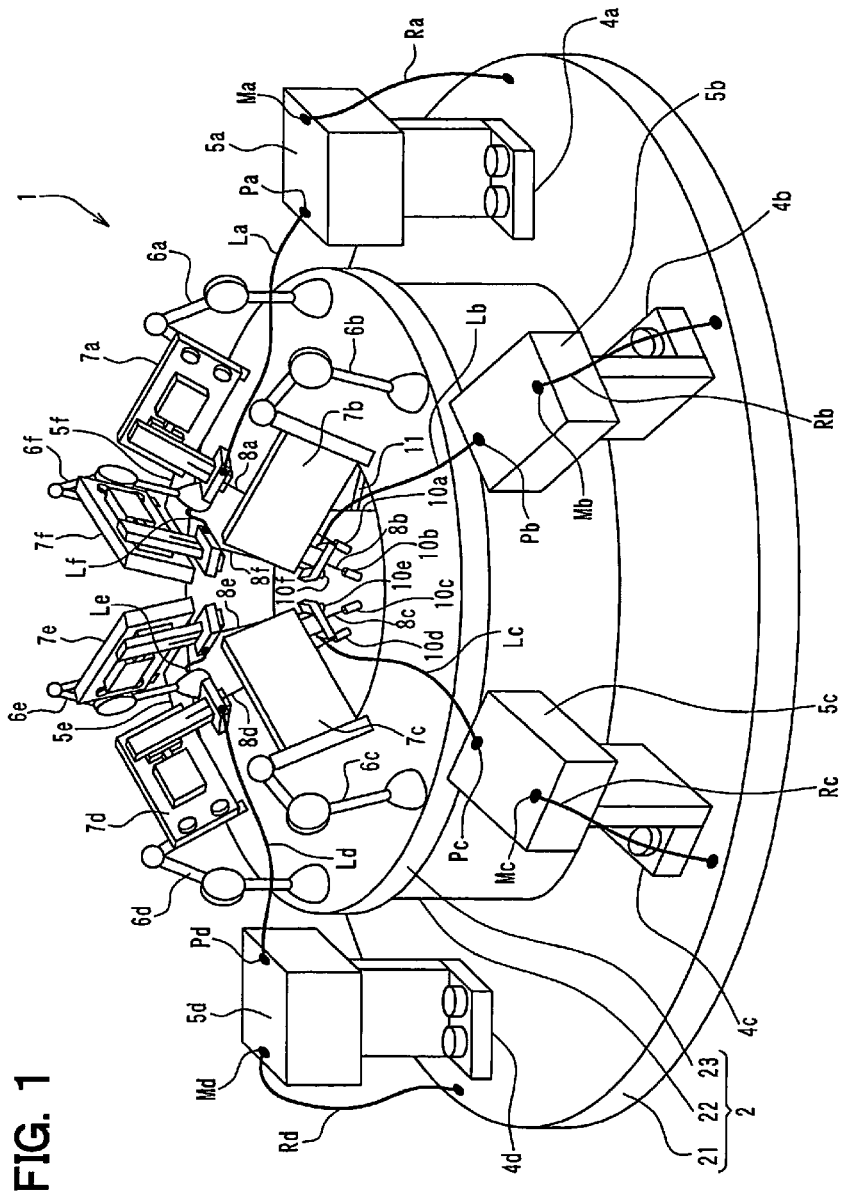
FIG. 1 is a perspective view illustrating an electric discharge machine according to a first embodiment of the present invention.
Figure 2:
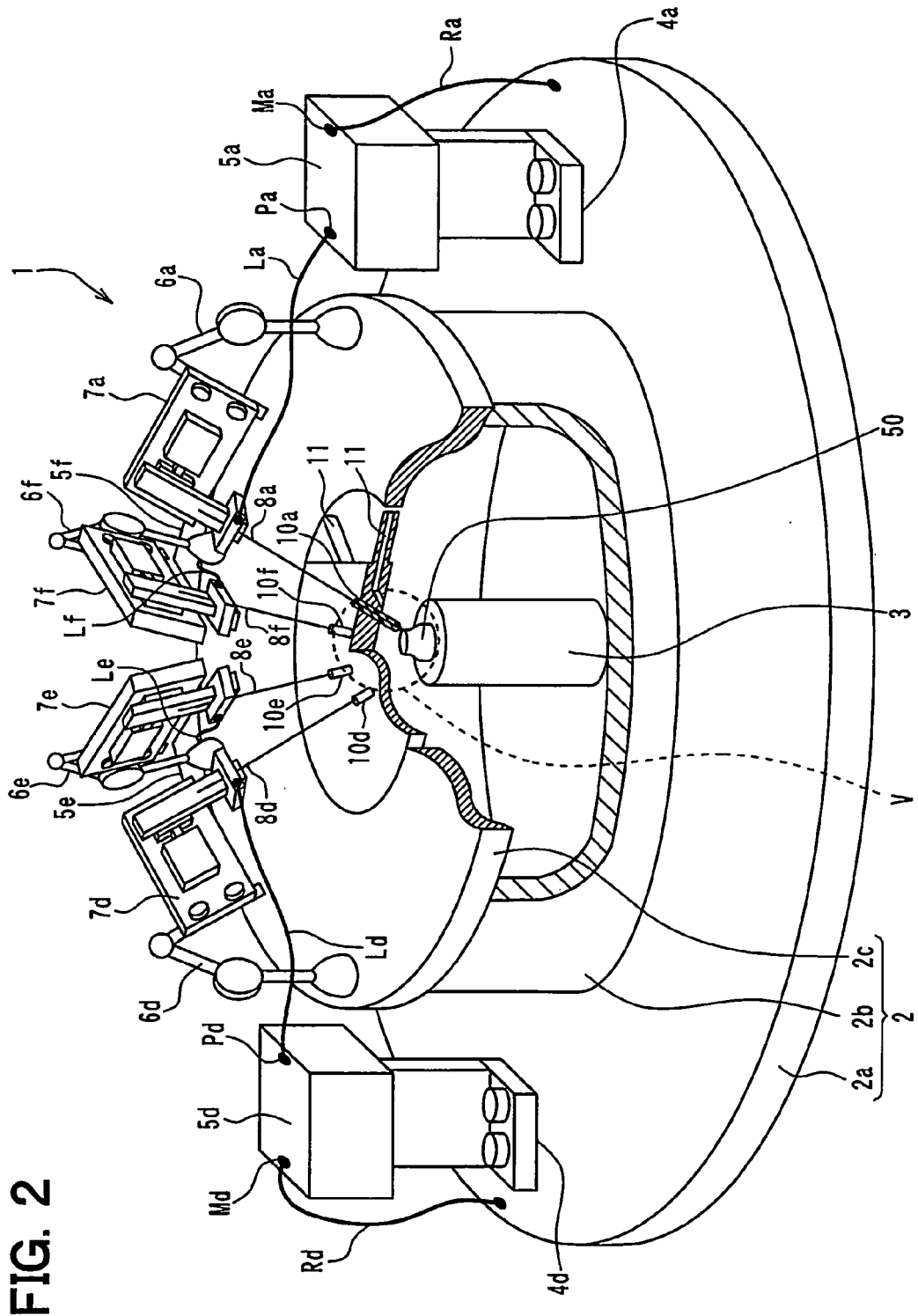
FIG. 2 is a perspective view illustrating the electric discharge machine in which a part of FIG. 1 is removed or cut.
Figure 3:
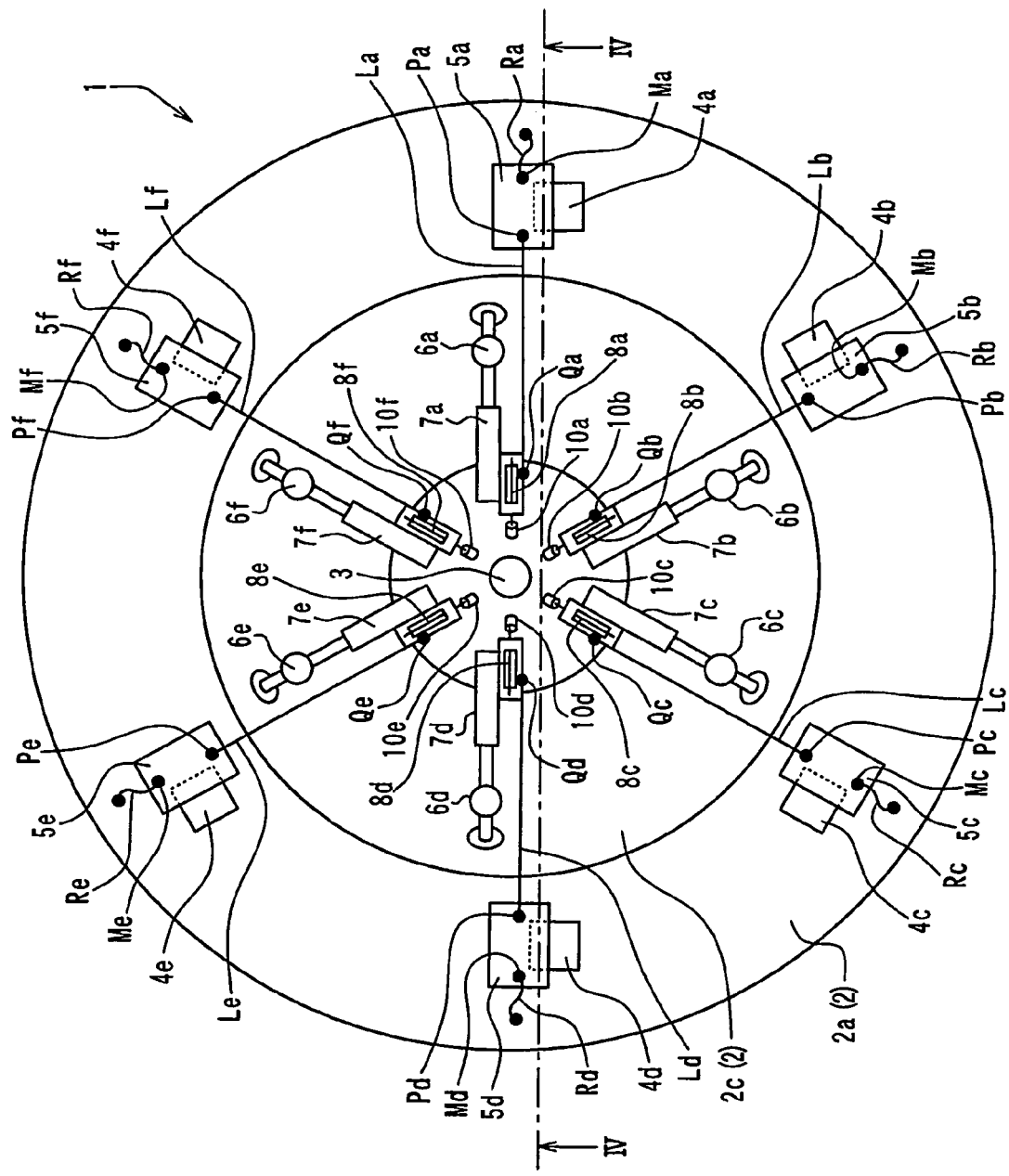
FIG. 3 is a plan view illustrating the electric discharge machine.
Figure 4:
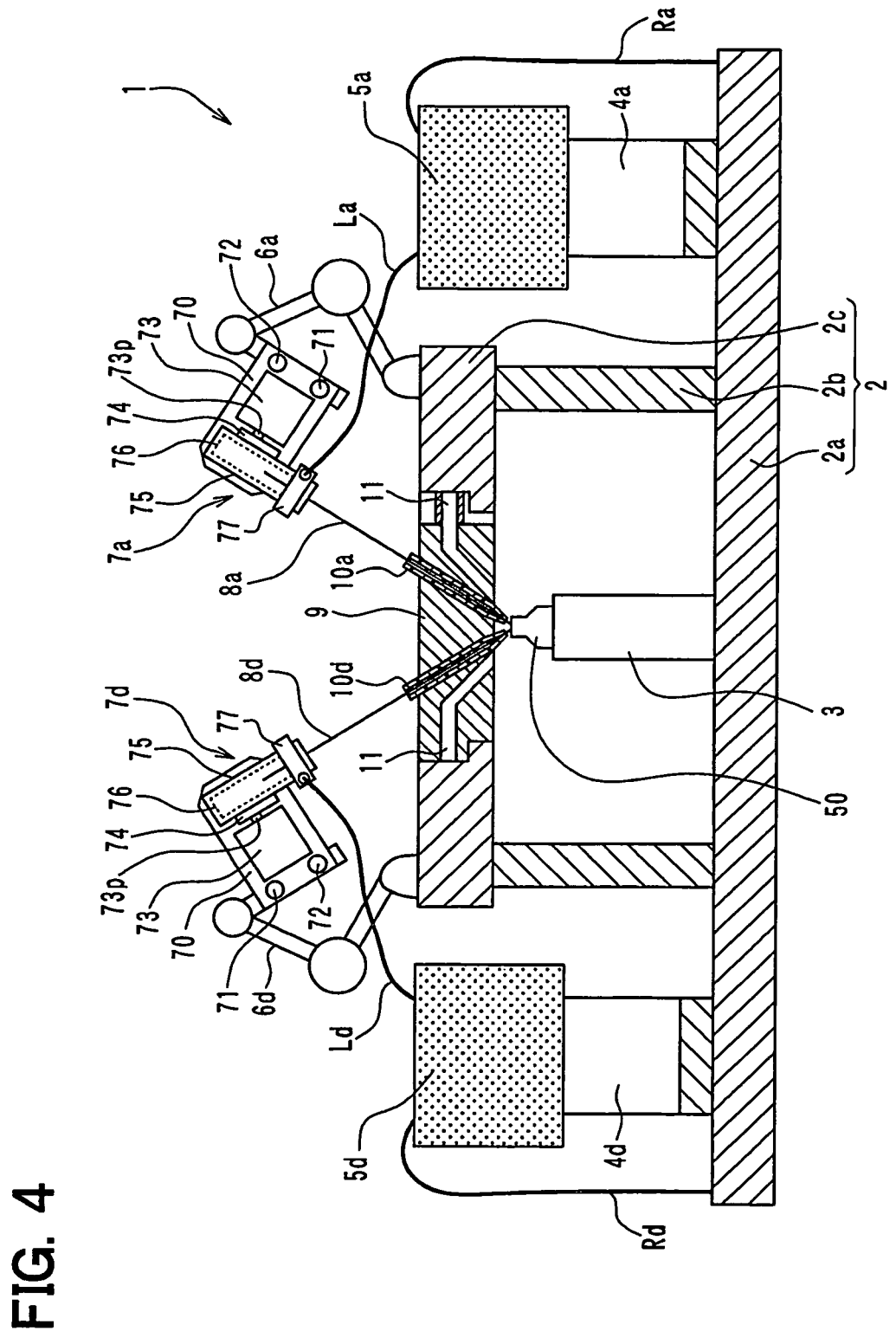
FIG. 4 is a cross-sectional view taken along line IV-IV of FIG. 3.
Figure 5:
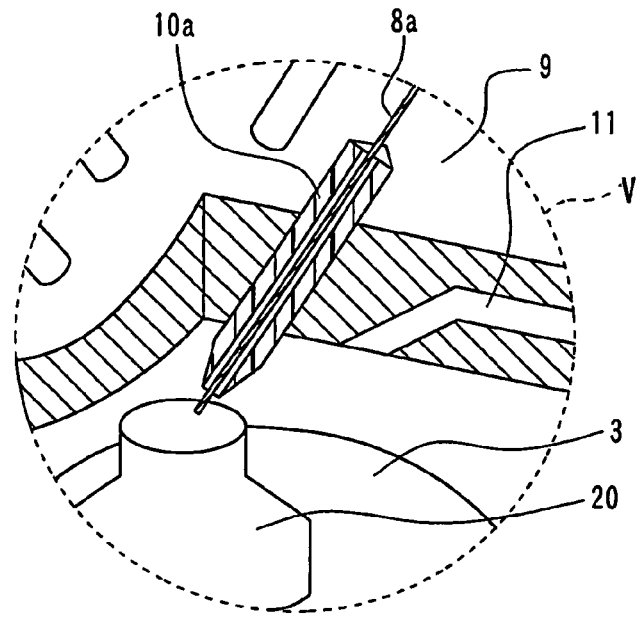
FIG. 5 is an enlarged view of a section V surrounded by a dashed line in FIG. 2.
Figure 6:
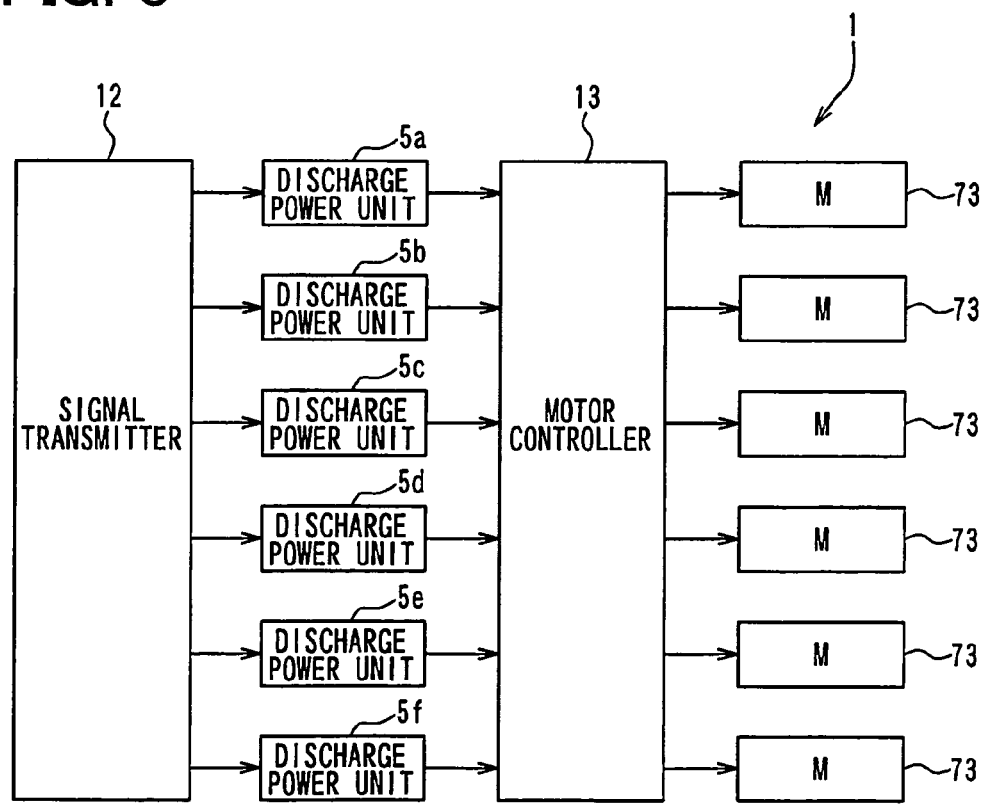
FIG. 6 is a block diagram illustrating a control construction of the electric discharge machine.

A first embodiment of the present invention will be described below. A construction of an electric discharge machine 1 according to the present embodiment is shown in FIGS. 1-6. FIG. 1 is a perspective view illustrating the electric discharge machine 1. FIG. 2 is a perspective view illustrating the electric discharge machine 1 of FIG. 1 in which a front part of it is removed. FIG. 3 is a plan view illustrating the electric discharge machine 1. FIG. 4 is a cross-sectional view taken along line IV-IV of FIG. 3. FIG. 5 is an enlarged view of a section V surrounded by a dashed line in FIG. 2. FIG. 6 is a block diagram illustrating a control construction of the electric discharge machine 1.

As shown in FIGS. 1-5, the electric discharge machine 1 includes a body 2, a work holder 3 located inside of the body 2, stays 4a-4f, discharge power supply units 5a-5f, fixed rods 6a-6f, discharge head units 7a-7f, power feeding lines La-Lf, Ra-Rf, electrodes 8a-8f, an electrode guide holder 9, electrode guides 10a-10f, and a working liquid passage 11. Further, as shown in FIG. 6, the electric discharge machine 1 has a signal transmitter 12 and a motor controller 13 at positions not recognized in FIGS. 1-5.

The body 2 is a component made of conductive metal, and has a base 21, a cylinder portion 22 and a top plate 23. The base 21 has a disc shape (about 560 mm in diameter), and is used as a foundation. The cylinder portion 22 has a cylindrical shape (about 150 mm in height), and is fixed at a top center of the base 21. The top plate 23 is attached to an upper end of the cylinder portion 22, and has a ring plate shape (about 280 mm in diameter).

As shown in FIGS. 2 and 3, the work holder 3 is located in the body 2 surrounded by the base 21, the cylinder portion 22 and the top plate 23. The work holder 3 is a pillar made of conductive metal, and is fixed at a top center of the base 21. When this electric discharge machine 1 is used, a work piece 50 made of conductive metal to be processed is arranged on a top face of the cylinder portion 22.

The six stays 4a-4f made of resin or metal are fixed to a top face of the base 21, and are located outside of the cylinder portion 22 with screws. As shown in FIG. 3 corresponding a view from a top, the stays 4a-4f are arranged at equal intervals on a circumference line centering on a position of the work holder 3 (that is, a position of the work piece 50).

The six discharge power supply units 5a-5f are fixed to upper ends of the stays 4a-4f, respectively. Therefore, when seen from a top, the units 5a-5f are arranged at equal intervals on a circumference line centering on the position of the work holder 3, and are located outside of the cylinder portion 22.

The discharge power supply units 5a-5f are power sources for impressing voltage between the electrodes 8a-8f and the work piece 50, respectively. When x is defined to represent one of a-f, the discharge power supply unit 5x has terminals Px, Mx as two poles. One terminal Px (for example, anode terminal) is electrically connected to the electrode 8x through the line Lx and the head unit 7x. The other terminal Mx (for example, cathode terminal) is electrically connected to the work piece 50 through the line Rx, the body 2 and the work holder 3.

The discharge power supply units 5a-5f are power sources independent from each other, and operate separately from each other. For example, original batteries are provided for the discharge power supply units 5a-5f, respectively. The discharge power supply units 5a-5f correspond to the electrodes 8a-8f, respectively. Each of the discharge power supply units 5a-5f impresses voltage only to the corresponding electrode 8a-8f. The voltage values impressed by the discharge power supply units 5a-5f between the corresponding electrodes 8a-8f and the work piece 50 are mutually the same.

Each of the discharge power supply units 5a-5f repeatedly (for example, periodically with the above-mentioned pulse period) detects a discharge state (discharge voltage, discharge current, etc.) between the electrode 8a-8f and the work piece 50. The detection result is output into the motor controller 13 (refer to FIG. 6).

The fixed rods 6a-6f are holding members made of resin or metal, and are fixed to the top face of the top plate 23. As shown in FIG. 3 corresponding a view from a top, the rods 6a-6f are arranged at equal intervals on a circumference line centering on the position of the work holder 3. The rods 6a-6f are used for holding the head units 7a-7f, respectively.

Each of the head units 7a-7f has a drive mechanism (ultrasonic motor 73, ceramic plate 74, head plate 75, and slide rail 76 which are mentioned later). The drive mechanism holds the corresponding electrode 8a-8f, and changes the position of the corresponding electrode 8a-8f. Moreover, each of the head units 7a-7f has an electrical connection medium (corresponding to electrode press 77 to be mentioned later). The electrical connection medium makes the corresponding discharge power supply unit 5a-5f and the corresponding electrode 8a-8f to be electrically connected with each other.

More specifically, as shown in FIG. 4, each of the head units 7a-7f has a head main part 70, fixing screws 71, 72, an ultrasonic motor 73, a ceramic plate 74, a head plate 75, a slide rail 76, and an electrode press 77.

The head main part 70 is a plate-shape component fixed at a tip end of the corresponding rod 6a-6f by the fixing screws 71, 72.

The ultrasonic motor 73 drives the corresponding electrode 8a-8f. The motor 73 makes a finger chip 73p to have an elliptic movement with frequency corresponding to an ultrasonic range. The elliptic movement of the finger chip 73p is performed within a parallel range to FIG. 4. The ultrasonic motor 73 may be a micro motor described in JP-A-H7-184382. This micro motor is widely sold as a HR1 motor from Nanomotion Ltd.

More specifically, the motor 73 is defined by four electrodes formed in checkered or mosaic state on a rectangle piezoelectric ceramic element. Further, the finger chip 73a is arranged at a center section of one side of the rectangle. High frequency voltage with about 40-80 kHz is applied to two diagonally-located electrodes of the ultrasonic motor 73, thereby the piezoelectric ceramic element is expanded or contracted, so that the elliptic movement is generated in the finger chip 73a. The elliptic movement of the finger chip 73p is transmitted to the ceramic plate 74 by a spring attached to the piezoelectric ceramic element, so that the ceramic plate 74 is moved linearly.

The ceramic plate 74 is a board member made of ceramic. The plate 74 is biased by the finger chip 73p having the elliptic movement, thereby the plate 74 is moved in a drive direction. More specifically, the plate 74 is moved in a pushing direction corresponding to the drive direction (in a direction approaching the work piece 50), or a pulling direction corresponding to the drive direction (in a direction separating from the work piece 50) in accordance with a direction of ellipse rotation of the finger chip 73p.

Figure 7A:
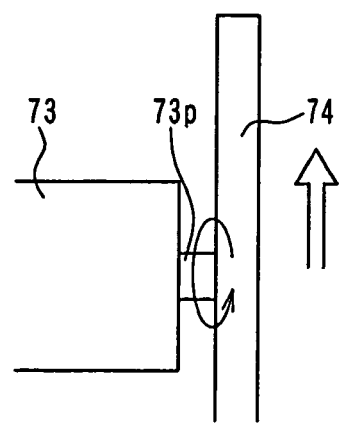
FIG. 7 is a view illustrating a relationship between an elliptic motion of a finger chip and a movement of a ceramic plate.
Figure 7B:
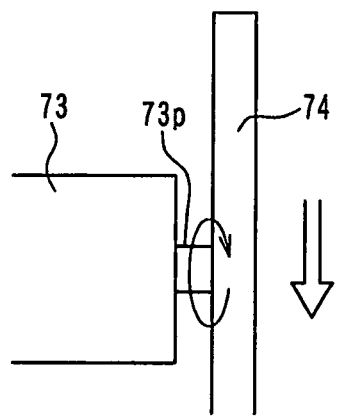

A relationship between the elliptic movement of the finger chip 73p and the movement of the ceramic plate 74 is explained with reference to FIGS. 7A and 7B. As shown in FIG. 7A, when the ceramic plate 74 is moved up (namely, in the direction separating from the work piece 50 along the drive direction), the elliptic movement of the finger chip 73*p* is carried out counterclockwise. As shown in FIG. 7B, when the ceramic plate 74 is moved down (namely, in the direction approaching the work piece 50 along the drive direction), the elliptic movement of the finger chip 73*p* is carried out clockwise.

The finger chip 73*p* and the ceramic plate 74 are always contact with each other at the time of the counterclockwise elliptic movement. The finger chip 73*p* presses the ceramic plate 74 more strongly while the finger chip 73*p* is going up, rather than while the finger chip 73*p* is going down. Therefore, frictional force applied to the ceramic plate 74 from the finger chip 73*p* is larger while the finger chip 73*p* is going up, so that the ceramic plate 74 is going up as a whole.

The finger chip 73*p* and the ceramic plate 74 are always contact with each other at the time of the clockwise elliptic movement. The finger chip 73*p* presses the ceramic plate 74 more strongly while the finger chip 73*p* is going down, rather than while the finger chip 73*p* is going up. Therefore, frictional force applied to the ceramic plate 74 from the finger chip 73*p* is larger while the finger chip 73*p* is going down, so that the ceramic plate 74 is going down, as a whole.

The finger chip 73*p* and the ceramic plate 74 are contact with each other when the elliptic movement of the chip 73*p* is stopped, so that the ceramic plate 74 is stopped by the frictional force between the chip 73*p* and the plate 74.

The head plate 75 is also a board member made of ceramic. The head plate 75 is fixed to the ceramic plate 74, and is engaged in a state slidable relative to the slide rail 76 fixed to the head main part 70. Therefore, the head plate 75 is moved in the pushing direction or the pulling direction along the drive direction together with the ceramic plate 74. An axis parallel to the pushing direction and the pulling direction of the head plate 75 corresponds to a drive shaft of the head unit 7*a*-7*f*.

The electrode press 77 is an annular conductive metal member. The press 77 is fixed to the head plate 75 by a screw, for example, so as to surround a lower end part of the head plate 75.

Each of the electrodes 8*a*-8*f* is supported between the head plate 75 and the electrode press 77, and is moved in the pushing direction or the pulling direction together with the ceramic plate 74, the head plate 75 and the electrode press 77.

The feeding line La-Lf electrically connects the press 77 to the corresponding discharge power supply unit 5*a*-5*f*. Thus, the units 5*a*-5*f* and the electrodes 8*a*-8*f* are electrically connected with each other through the lines La-Lf and the electrode press 77, respectively.

The electrode 8*a*-8*f* has a wire shape with a small diameter, and is made of round bar constructed by thin hollow (or solid) lines of copper or tungsten, for example. Each of the electrodes 8*a*-8*f* is supported by the head plate 75 and the electrode press 77, and extends inside of the electrode guide 10*a*-10*f* toward an upper end of the work holder 3. A longitudinal direction of the electrode 8*a*-8*f* corresponds to the pushing direction. In the present embodiment, holes are formed in the work piece 50 by generating discharges between the electrodes 8*a*-8*f* and the work piece 50, respectively.

The electrode guide holder 9 is a metal component having a partially-cut disc shape, and is arranged in a cutout disk portion of the top plate 23. As shown in FIG. 5, the electrode guide 10*a*-10*f* is buried in the holder 9, and penetrates the holder 9 from the upper face to the bottom face. Moreover, six independent (or common use) working liquid passages 11 are defined in the holder 9.

Each of the electrode guides 10*a*-10*f* is a hollow bar made of non-conductive component such as ceramic. At a time of starting electric discharge machining, the electrodes 8*a*-8*f* are suitably moved toward the work piece 50, because each of the electrodes 8*a*-8*f* passes through the hollow section. As shown in FIG. 3 corresponding a view from a top, the six electrode guides 10*a*-10*f* are arranged at equal intervals on a circumference line centering on the position of the work piece 50 on the work holder 3. Therefore, distances from the position of the work piece 50 to the electrode guides 10*a*-10*f* are equal with each other. The working liquid passage 11 is used for continuously supplying working liquid such as water to the work piece 50 on the work holder 3 at the time of electric discharge machining.

The signal transmitter 12 and the motor controller 13 (refer to FIG. 6) are arranged in exterior of the electric discharge machine 1 of FIG. 1.

The signal transmitter 12 outputs pulse signals simultaneously to the discharge power supply units 5*a*-5*f* with a predetermined pulse period (for example, 0.1 microsecond). Each of the discharge power supply units 5*a*-5*f* impresses a pulse voltage between the corresponding electrode 8*a*-8*f* and the work piece 50 at a timing of receiving a pulse signal from the signal transmitter 12.

The motor controller 13 controls each of the ultrasonic motors 73 of the head units 7*a*-7*f*. Specifically, an operation of the ultrasonic motor 73 corresponding to the electrode is controlled based on the detection voltage received from the corresponding discharge power supply unit 5*a*-5*f*, in a manner that the distance between the corresponding electrode 8*a*-8*f* and the work piece 50 becomes proper. The movement of the electrode 8*a*-8*f* is controlled in the pushing direction or the pulling direction by the motor controller 13, in a manner that the distance between the corresponding electrode 8*a*-8*f* and the work piece 50 is always proper. The motor controller 13 may be a well-known microcomputer having CPU, RAM, ROM, flash memory, etc., or an ECU constructed by a driver circuit to control the ultrasonic motor 73.

The head units 7*a*-7*f* of the machine 1 are arranged in equal intervals on a circumference line centering on the work holder 3. The machine 1 includes the discharge power supply units 5*a*-5*f* corresponding to the head units 7*a*-7*f*, respectively.

Feature of component arrangement in the electric discharge machine 1 is explained. As shown in FIG. 3, each of the discharge power supply units 5*a*-5*f* is located on approximately the same straight line defined by connecting the corresponding discharge head unit 7*a*-7*f* and the work holder 3. More specifically, the terminal Pa-Pf of the unit 5*a*-5*f*, the terminal Qa-Qf of the head unit 7*a*-7*f* connected to the terminal Pa-Pf through the line La-Lf, and the work piece 50 on the work holder 3 are located on approximately the same straight line. That is, when any one of a-f is adopted as x, the power supply terminal Px, the connection terminal Qx, and the position of the work piece 50 are arranged on approximately the same straight line.

When seen from the top side, the feeding line La-Lf is arranged to approximately linearly extend from the terminal Pa-Pf to the terminal Qa-Qf. Further, when seen from a horizontal direction as shown in FIGS. 1 and 4, the line La-Lf is slightly bended by gravity, but the line La-Lf is approximately straight from the power supply terminal Pa-Pf to the connection terminal Qa-Qf.

The head units 7*a*-7*f* and the corresponding discharge power supply units 5*a*-5*f* are arranged in radial state, in this order, centering on the position of the work piece 50 on the work holder 3. The lines La-Lf are similarly arranged in radial state centering on the position of the work piece 50. In this case, electric interference can be reduced among the lines La-Lf, so that electric noise can be reduced at the time of electric discharge machining.

When the electric discharge machine 1 is seen from the top, the head units 7a-7f (specifically, the terminals Qa-Qf) are arranged at equal intervals on a circumference line centering on the position of the work piece 50 on the work holder 3. Further, the power supply units 5a-5f (specifically, the terminals Pa-Pf) are arranged at equal intervals on a larger circumference line centering on the position of the work piece 50 on the work holder 3. All of angle clearances between adjacent radiation arrangements from the units 7a-7f to the corresponding units 5a-5f (more specifically, radiation arrangements from the terminals Qa-Qf to the corresponding terminals Pa-Pf) are almost equal with each other. Therefore, the lines La-Lf also have radiation arrangement centering on the position of the work piece 50 on the work holder 3, so that all the angle clearances between the adjacent radiation arrangements are almost equal with each other.

Because the position arrangement of the lines La-Lf is symmetrical relative to a center corresponding to the work holder 3, influence of electric mutual interference is equally generated among the lines La-Lf. Therefore, electrical properties of the electrodes 8a-8f are equalized with each other in an electric discharge machining, so that the electric discharge machining can be stabilized, and that noise generation can be reduced.

Moreover, distances from the discharge power supply units 5a-5f to the corresponding head units 7a-7f are almost the same. More specifically, distances from the terminals Pa-Pf to the terminals Qa-Qf through the lines La-Lf are almost the same with each other, and dimensions of the lines La-Lf are also almost the same with each other. Therefore, impedances of the lines La-Lf become almost uniform. Thus, electrical properties of discharges generated between the electrodes 8a-8f and the work piece 50 become uniform, so that the electric discharge machining can be stabilized, and that noise generation can be reduced.

Moreover, distances from the head units 7a-7f to the corresponding electrode guides 10a-10f are almost the same. More specifically, distances are almost equal with each other from a contact point between the electrode 8a-8f and the electrode press 77 of the unit 7a-7f to an inlet of an through hole defined in the guide 10a-10f, into which the electrode 8a-8f is inserted, adjacent to the head unit 7a-7f. Further, distances are almost equal with each other from a connection point between the electrode 8a-8f and the electrode press 77 of the unit 7a-7f to an end of the electrode 8a-8f adjacent to the work piece 50.

Therefore, dimensions of the electrodes 8a-8f from the contact point toward the work piece 50 become approximately uniform. Thus, impedances of the electrodes 8a-8f become uniform, so that the electric discharge machining can be stabilized, and that noise generation can be reduced.

The work piece 50 will be described below. The work piece 50 of the present embodiment may be a nozzle body of a fuel injection nozzle to inject fuel (gasoline fuel, diesel fuel, etc.) into a cylinder of an engine.

Figure 8:
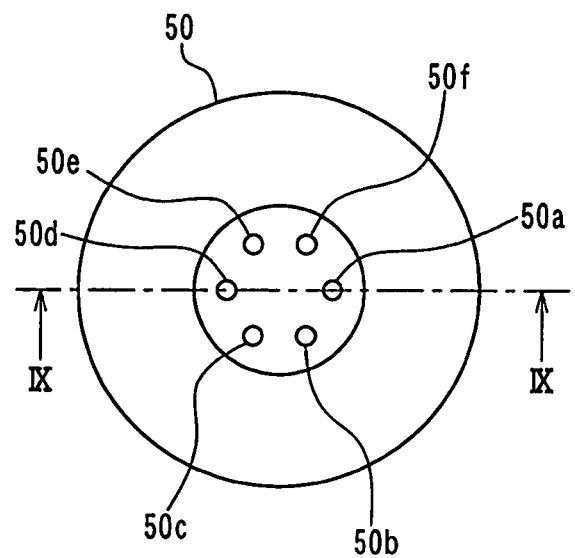
FIG. 8 is a plan view illustrating a work piece completed as a nozzle body.
Figure 9:
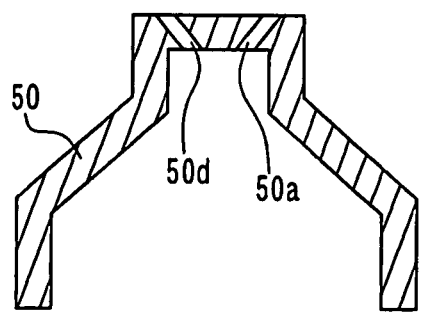
FIG. 9 is a cross-sectional view taken along line IX-IX of FIG. 8.

FIG. 8 is a plan view of the work piece 50 completed as the nozzle body by forming holes by electric discharge machining. FIG. 9 is a cross-sectional view taken along line IX-IX of FIG. 8. As shown in FIG. 8, six injection holes 50a-50f are defined at equal intervals in a circle on a top face of the work piece 50. Moreover, the holes 50a-50f are aslant extended, so that the holes 50a-50f approach mutually as going downward from the top face. Upper and lower sides of the work piece 50 are defined when the work piece 50 is arranged on the work holder 3.

When it is necessary to form the plural holes 50a-50f in a single nozzle, the electric discharge machine 1 of the present embodiment can form the holes 50a-50f by single work using the electrodes 8a-8f of the same number.

The axis of the electrode 8a-8f, the axis of the through hole of the electrode guide 10a-10f and the drive shaft of the corresponding head unit 7a-7f are made to correspond with each other so as to have the above advantage. Inclinations of the axes are made in agreement with a designed inclination of the axis of the hole 50a-50f at the time of arranging the work piece 50 on the work holder 3. Therefore, after the work piece 50 is arranged at a predetermined position (center on the top face) of the work holder 3, holes can be formed as the injection holes 50a-50f at planned positions with planned inclinations by straightly sending the electrodes 8a-8f along the drive axis, respectively. Thus, the electrodes 8a-8f can be supplied in stabilized state.

Directions extending from the work holder 3 to the head units 7a-7f (more specifically, to the head plates 75) are defined in radial state centering on the work holder 3. More specifically, when the electric discharge machine 1 is seen from the top, in a case where a circle is assumed with a center corresponding to the position of the work piece 50 and with a radius distance from the planned position of the hole 50a-50f of the work piece 50 to the center, the head units 7a-7f (specifically, the head plate 75) are arranged outside of the circle. Therefore, an area for arranging the head units 7a-7f can be made larger, and the head units 7a-7f can be placed in a sufficiently separated state from each other. Thus, electric noise can be reduced at the time of electric discharge machining. Further, the ultrasonic motor 73 used as a motor for driving the electrode 8a-8f is different from a conventional one using electromagnetic force. Therefore, a size of the head unit 7a-7f can be made smaller.

Hereafter, a producing method of a nozzle body (or a processing method of a nozzle body) using this electric discharge machine 1 is explained. First, an operator sets the work piece 50 to be formed into the nozzle body on a top center section of the work holder 3 of the electric discharge machine 1, as shown in FIGS. 2 and 3. At this time, the position of the ceramic plate 74 is adjusted in the drive direction in a manner that the distances become equal with each other from the contact point between the electrode 8a-8f and the electrode press 77 of the head unit to the electrode guide 10a-10f.

The operator starts an operation of the signal transmitter 12. The signal transmitter 12 begins to output pulse signals simultaneously to the discharge power supply units 5a-5f with a predetermined pulse period (for example, 0.1 millisecond or 1 millisecond).

Each of the discharge power supply units 5a-5f impresses pulse voltage between the corresponding electrode 8a-8f and the work piece 50 only for a period shorter than the pulse period at a timing when receiving the pulse signal from the signal transmitter 12.

Each of the discharge power supply units 5a-5f repeatedly (for example, with a period of 2 millisecond) detects discharge state between the corresponding electrode 8a-8f and the work piece 50. The detection result is output into the motor controller 13. The motor controller 13 controls rotation direction and speed of the finger chips 73p of the six ultrasonic motors 73 based on the detection voltage received from the discharge power supply units 5a-5f, in a manner that each of the distances between the work piece 50 and the electrodes 8a-8f becomes proper. The positions of the ceramic plate 74 and the head plate 75 are controlled through the motor controller 13, thereby the electrodes 8a-8f are controlled. More specifically, the movement of the electrode 8a-8f is controlled in the pushing direction or the pulling direction in a manner that the distance between the work piece 50 and the electrode 8a-8f becomes always proper, that is in a manner that a normal discharge is generated when a voltage is applied between the work piece 50 and the electrode 8a-8f.

When voltage is repeatedly impressed to each of the electrodes 8a-8f simultaneously from each of the discharge power supply units 5a-5f in a state that the distance between the work piece 50 and the electrode 8a-8f is maintained proper, discharges occur between tip ends of the electrodes 8a-8f and the work piece 50, respectively, with the timing at which the pulse voltage is applied. This is because voltages are impressed to the electrodes 8a-8f, respectively and independently from each other, from the discharge power supply units 5a-5f different from each other.

This point will be explained in details by comparing with a conventional electric discharge machine. For example, in an electric discharge machine described in JP-A-H9-85536, pulse voltages are impressed to plural electrodes so as to perform electric discharge machining. However, each electrode of the electric discharge machine of the comparison example receives a pulse voltage from the same power source. Therefore, even if voltages are simultaneously impressed to the electrodes in parallel with each other at a timing of applying the pulse voltage, only one discharge occurs between a certain electrode and the work piece 50, because electric states between the electrodes and the work piece are slightly different from each other. Discharge occurs between one best-conditioned electrode and the work piece. Once discharge occurs between a certain electrode and the work piece 50, discharge does not occur between other electrodes and the work piece 50, because all current passes from the certain electrode to the work piece 50.

Figure 10B:
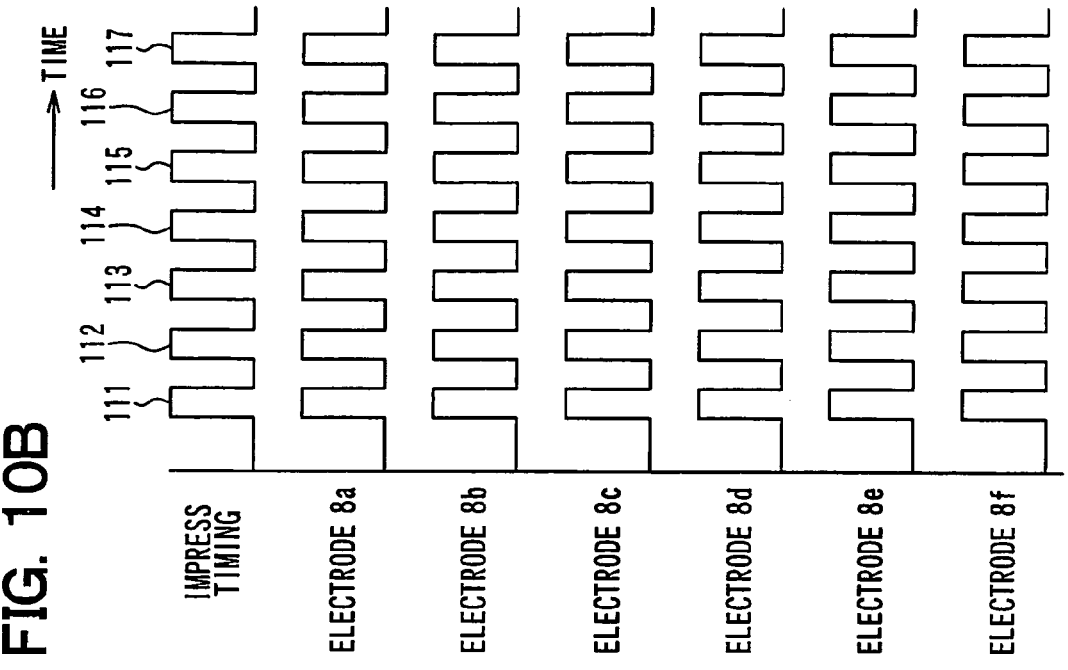
FIG. 10 is a timing chart illustrating a relationship between an impress timing of pulse voltage and a discharge timing of each electrode.
Figure 10A:
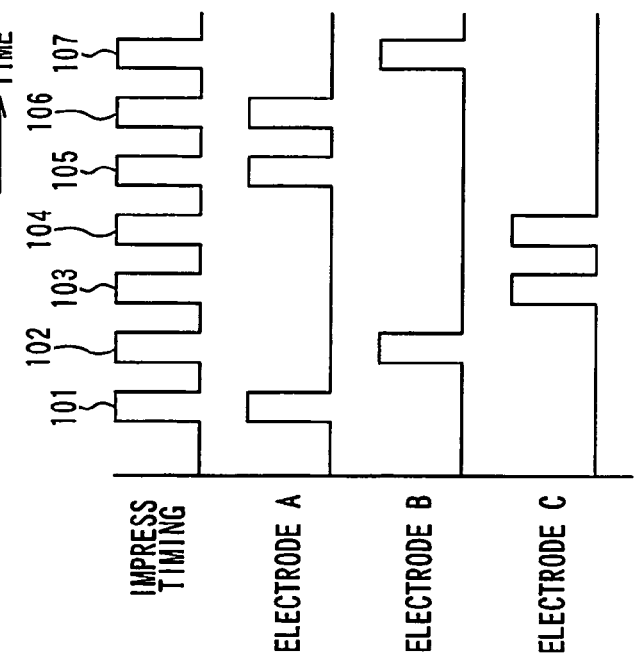

FIG. 10 shows a timing chart illustrating a relationship between impress timing of pulse voltage and discharge timing of each electrode. FIG. 10A is drawn for electric discharge machining of the comparison example, and FIG. 10B is drawn for electric discharge machining of the present embodiment. The pulse voltage is applied, or the discharge is generated at a rising timing in the timing chart.

As shown in FIG. 10A corresponding to the electric discharge machine of the comparison example, discharge occurs only between one electrode and the work piece 50 at a voltage impress timing 101-107. Therefore, the number of the discharges generated by N-times impress timings is only about N-times in spite of the number of the electrodes.

As shown in FIG. 10B corresponding to the electric discharge machine 1 of the present embodiment, discharges are generated between each of the electrodes 8a-8f and the work piece 50 at a voltage impress timing 111-117. Therefore, the number of the discharges generated in N-times impress timings is about N×M-times, when the number of the electrodes is defined as M.

The number of the discharges per voltage impress timing will be M, when the power sources are prepared independently and respectively for each electrode, compared with a case where only one power source is prepared for the plural electrodes. Therefore, the processing of the work piece 50 can be performed faster. However, a power consumption amount per unit time becomes large, because the processing is performed faster.

If the processing of the work piece of the comparison example is required to be performed as fast as that of the present embodiment, a large-scale power source is needed. In this case, a large area is needed for the large-scale power source, and noise generation will be increased, so that fine-processing will be unstable.

Discharges are simultaneously generated between each of the electrodes 8a-8f and the work piece 50 with the same voltage impress timing in the present embodiment. Therefore, noise generated by the discharges can be reduced in the present embodiment, compared with a case where discharges are generated at different timings in each electrode.

Moreover, while the processing is performed by repeating the discharge by the electrode 8a-8f, working liquid is continuously supplied to the work piece 50 through the working liquid passage 11 from a working liquid source which is not illustrated.

Moreover, when one of the electrodes 8a-8f penetrates the work piece 50 in the processing, the motor controller 13 stops the discharge of the penetrating electrode, and stops the movement of the penetrating electrode.

Therefore, the motor controller 13 has a penetration detector to detect the penetration of the electrode 8a-8f into the work piece 50. Specifically, the motor controller 13 detects a timing that the each of the electrodes 8a-8f starts discharge based on a discharge state detected by the discharge power supply units 5a-5f. The present position of the electrode in the drive direction is memorized in the RAM of the microcomputer as a discharge start position at a timing when the start of the discharge is detected for a certain electrode. Then, the motor controller 13 repeatedly determines the position of the electrode in the drive direction to be progressed from the discharge start position by a predetermined distance. When the electrode is determined to be progressed by the predetermined distance, the motor controller 13 determines that the electrode penetrates the work piece 50. The predetermined distance may be recorded in the ROM or the flash memory of the microcomputer as a value larger than a thickness of a portion of the work piece 50 to be processed into the hole.

The motor controller 13 may detect the position of the electrode 8a-8f through a calculation using rotation direction and speed of the motor 73. Alternatively, the motor controller 13 may detect the position of the head plate 75 using a sensor such as a rotary encoder.

The motor controller 13 may stop the discharge of the electrode 8a-8f, for example, by controlling the corresponding discharge power supply unit to stop the operation of the pulse discharge. The motor controller 13 may stop the movement of the electrode 8a-8f by stopping the operation of the motor 73 to move the corresponding electrode.

Thus, each of the electrodes 8a-8f can be prevented from further being sent in the pushing direction when the electrode 8a-8f penetrates the work piece 50 to form the hole 50a-50f. Therefore, the electrodes 8a-8f can be prevented from physically interfering with each other (that is, from colliding with each other) after the penetration of the work piece 50.

The holes 50a-50f are formed in the work piece 50 by the electrodes 8a-8f through the above processes, so that a nozzle body is completed.

The present invention is not limited to the present embodiment. Changes and modifications are to be understood as being within the scope of the present invention as defined by the appended claims.

For example, the positions and the directions of the head units 7a-7f are not changed relative to the work holder 3 in this embodiment. Alternatively, the positions and the directions of the head units 7a-7f may be manually changed in accordance with positions and directions of holes to be formed in the work piece 50. In this case, the positions of the discharge power supply units 5a-5f may be also changed in accordance with the changes of the head units 7a-7f, in a manner that the position of the work piece 50 on the work holder 3, the terminal Qx of the head unit 7x, and the terminal Px of the discharge power supply unit 5x are always located on the same straight line when x is defined to represent one of a-f and when the electric discharge machine 1 is seen from the top. Further, the positions of the discharge power supply units 5a-5f may be also changed in accordance with the changes of the head units 7a-7f, in a manner that the distance from the discharge power supply unit 5x to the head unit 7x are made constant when x is defined to represent one of a-f.

The work piece is not limited to the fuel injection nozzle. The work piece may be other object in which plural holes are made by electric discharge machining.

The number of the discharge power supply units 5a-5f, the fixed rods 6a-6f, the head units 7a-7f, the electrodes 8a-8f, and the electrode guides 10a-10f are six, respectively, in the embodiment. The number of these components may be suitably changed in a range equal to or larger than two in accordance with the number of holes to be formed in the work piece 50.

The voltage impress timings of the electrodes 8a-8f synchronize with each other in the embodiment. Alternatively, the voltage impress timings may be different among the electrodes 8a-8f, when the machine 1 is aimed only for improving the processing speed.

The ultrasonic motor 73 may be changed into a usual motor (linear motor etc.) to move the electrode 8a-8f. Moreover, the motor controller 13 may be constructed by one controller d1 and plural ultrasonic motor drivers e1, f1.

Second Embodiment

Figure 11:
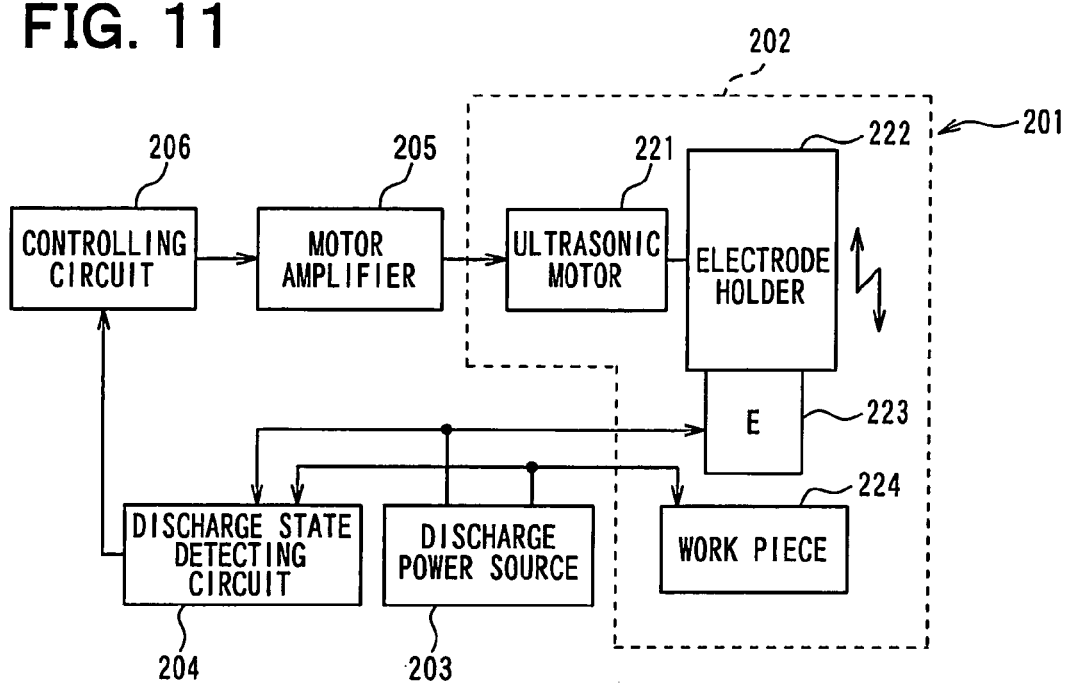
FIG. 11 is a block diagram illustrating a construction of an electric discharge machine according to a second embodiment of the present invention.

A second embodiment of the present invention will be described below. A construction of an electric discharge machine 201 according to the present embodiment is shown in FIG. 11. Discharge is generated by applying voltage between an electrode and a work piece, thereby the machine 201 processes the work piece by melting.

As shown in FIG. 11, the electric discharge machine 201 has a mechanism part 202, a discharge power source 203, a discharge state detector circuit 204, a motor amplifier 205, and a controlling circuit 206. The mechanism part 202 of the electric discharge machine 201 is a portion to perform a mechanical operation, and has an ultrasonic motor 221, an electrode holder 222, and an electrode 223, for example. A work piece 224 is arranged in the mechanism part 202.

The ultrasonic motor 221 is a motor to move the electrode holder 222 in a drive direction (specifically, up or down). The electrode holder 222 is a component to hold the electrode 223. The electrode 223 is a wire with a small diameter (for example, equal to or smaller than 0.2 mm), and is made of round bar constructed by thin hollow (or solid) lines of copper or tungsten, for example. When the holder 222 is moved in the drive direction by the motor 221, the electrode 223 is similarly moved in the drive direction.

The discharge power source 203 repeatedly impresses a predetermined pulse voltage between the electrode 223 and the work piece 224. A period of the repetition is from several 10-thousandth of a second to several 10-millionth of a second, for example. In a state that the electrode 223 is separated from the work piece 224 by a suitable distance, if voltage is impressed between the electrode 223 and the work piece 224, discharge occurs between the electrode 223 and the work piece 224, so that a part of the work piece 224 has fusion.

The discharge state detector circuit 204 always detects a discharge state of the discharge power source 203 (namely, a discharge state between the electrode 223 and the work piece 224), and outputs the detected discharge state into the controlling circuit 206 as a discharge state signal. The detected discharge state may be a discharge voltage impressed between the electrode 223 and the work piece 224, or a discharge current which flows between the electrode 223 and the work piece 224, for example.

The motor amplifier 205 is a circuit to drive the ultrasonic motor 221 in response to an electrode drive signal received from the controlling circuit 206. More specifically, the ultrasonic motor 221 is activated only while an absolute value of the electrode drive signal is equal to or larger than a specified value (specifically zero), when the amplifier 205 receives the electrode drive signal from the controlling circuit 206. The ultrasonic motor 221 is operated at higher speed as the absolute value of the received electrode drive signal is higher, so that the electrode holder 222 is moved at higher speed. The amplifier 205 is defined to receive an electrode drive signal if the absolute value of the electrode drive signal received by the amplifier 205 is equal to or larger than the specified value (specifically zero).

The controlling circuit 206 is a microcomputer having known CPU, RAM, ROM, flash memory, and the like. The CPU outputs an electrode drive signal into the motor amplifier 205 based on the discharge state signal received from the discharge state detector circuit 204 by executing a program recorded in the ROM. Fundamentally, an electrode drive signal is output into the motor amplifier 205 in a manner that an interval between the electrode 223 and the work piece 224 becomes suitable for electric discharging, so that the position of the electrode 223 is controlled in the drive direction.

Figure 12:
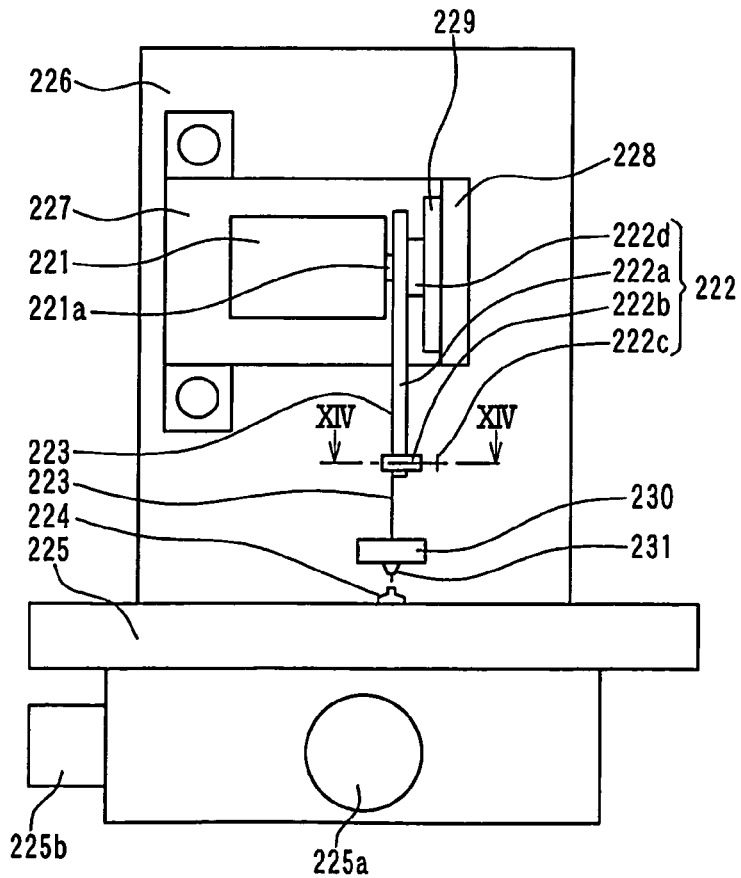
FIG. 12 is a view illustrating a mechanism portion of the electric discharge machine.

Detailed construction of the mechanism part 202 is shown in FIG. 12. The mechanism part 202 has an XY stage 225, a back plate 226, a fixed plate 227, a slide rail 229, an electrode guide holder 230, and an electrode guide 231, in addition to the above-mentioned ultrasonic motor 221, the electrode holder 222 and the electrode 223.

The work piece 224 is arranged on the XY stage 225. A position of the work piece 224 is changed in a horizontal face relative to the electrode 223 by moving the stage 225 in an X-axis direction 225x and a Y-axis direction 225y. Moreover, the XY stage 225 is electrically connected to a ground side terminal of the discharge power source 203 through a power feeding line which is not illustrated.

The back plate 226 is fixed to the XY stage 225, and stands as a wall. The fixed plate 227 is a board fixed to a side face of the back plate 226 through a screw, and is located in parallel to the back plate 226. The ultrasonic motor 221 and the electrode holder 222 are fixed to a face of the fixed plate 227 opposite from the back plate 226.

The ultrasonic motor 221 will be described below. The ultrasonic motor 221 drives the electrode 223 by making a finger chip 221a to have circular movement (specifically, elliptic movement) with ultrasonic range frequency. An operation speed of the ultrasonic motor 221 is equivalent to a rotation number of the elliptic movement of the finger chip 221a per unit time. The elliptic movement of the finger chip 221a is performed within parallel range to FIG. 12. The ultrasonic motor 221 may be a micro motor described in JP-A-H7-184382. This micro motor is widely sold as a HR1 motor from Nanomotion Ltd.

More specifically, the motor 221 is defined by four electrodes formed in checkered or mosaic state on a rectangle piezoelectric ceramic element. Further, the finger chip 221a is arranged at a center section of one side of the rectangle. High frequency voltage with about 40 kHz is applied to two diagonally-located electrodes of the ultrasonic motor 221, thereby the piezoelectric ceramic element is expanded or contracted, so that the elliptic movement is generated in the finger chip 221a.

The electrode holder 222 has a ceramic plate 222a, an electrode press 222b, an electrode-pressing screw 222c, and a moving unit 222d. The ceramic plate 222a is always contact with the finger chip 221a located on a tip end of the ultrasonic motor 221. When the finger chip 221a has an elliptic movement by the operation of the ultrasonic motor 221, the elliptic movement of the finger chip 221a is transmitted to the ceramic plate 222a by a spring attached to the piezoelectric ceramic element, so that the ceramic plate 222a is moved linearly.

Figure 13A:
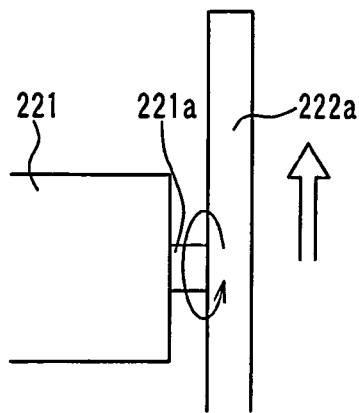
FIG. 13 is a view illustrating a relationship between an elliptic motion of a finger chip and a movement of a ceramic plate.
Figure 13B:
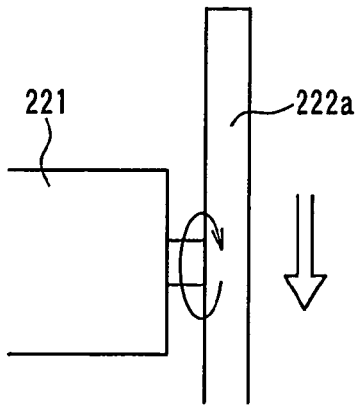

A relationship between the elliptic movement of the finger chip 221a and the movement of the ceramic plate 222a is explained with reference to FIGS. 13A and 13B. As shown in FIG. 13A, when the ceramic plate 222a is moved up (namely, in the direction separating from the work piece 224 along the drive direction), the elliptic movement of the finger chip 221a is carried out counterclockwise. As shown in FIG. 13B, when the ceramic plate 222a is moved down (namely, in the direction approaching the work piece 224 along the drive direction), the elliptic movement of the finger chip 221a is carried out clockwise.

The finger chip 221a and the ceramic plate 222a are always contact with each other at the time of the counterclockwise elliptic movement. The finger chip 221a presses the ceramic plate 222a more strongly while the finger chip 221a is going up, rather than while the finger chip 221a is going down. Therefore, frictional force applied to the ceramic plate 222a from the finger chip 221a is larger while the finger chip 221a is going up, so that the ceramic plate 222a is going up as a whole.

The finger chip 221a and the ceramic plate 222a are always contact with each other at the time of the clockwise elliptic movement. The finger chip 221a presses the ceramic plate 222a more strongly while the finger chip 221a is going down; rather than while the finger chip 221a is going up. Therefore, frictional force applied to the ceramic plate 222a from the finger chip 221a is larger while the finger chip 221a is going down, so that the ceramic plate 222a is going down as a whole.

The ceramic plate 222a is stopped by the frictional force between the chip 221a and the plate 222a when the elliptic movement of the chip 221a is stopped, because the finger chip 221a and the ceramic plate 222a are contact with each other.

The ceramic plate 222a is fixed to the moving unit 222d. The moving unit 222d is engaged with the slide rail 229 fixed to the fixed plate 227. The moving unit 222d is flexibly movable along the slide rail 229, and is a component made of ceramic.

Figure 14:
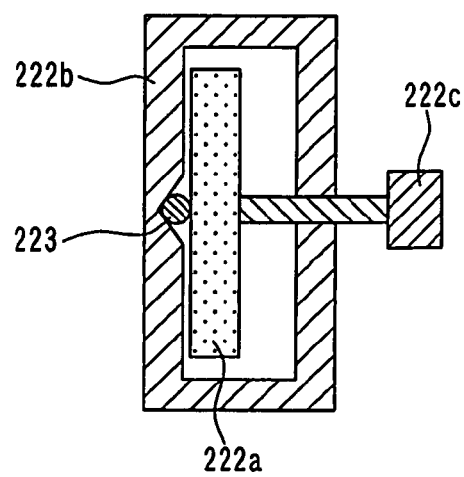
FIG. 14 is a cross-sectional view taken along line XIV-XIV of FIG. 12.

The electrode press 222b is a conductive metal component for holding the electrode 223 together with the finger chip 221a and the screw 222c. FIG. 14 is a cross-sectional view taken along line XIV-XIV of FIG. 12. As shown in this figure, the electrode press 222b is a tube-shaped component to surround a side face of a lower end part of the ceramic plate 222a. A face of the electrode press 222b has a screw hole, and the screw 222c extends through the screw hole from a periphery of the press 222b. The screw 222c is contact with a face of the ceramic plate 222a not opposing to the electrode 223. Thus, the ceramic plate 222a is pressed toward the electrode 223 and an inner periphery of the electrode press 222b, so that the electrode 223 is held between the ceramic plate 222a and the electrode press 222b. That is, the electrode 223 is directly held by the ceramic plate 222a and the electrode press 222b, so that the electrode press 222b is electrically connected to the electrode 223.

The electrode press 222b is electrically connected to non-ground side terminal of the discharge power source 203 through a power feeding line (having diameter of about 1 mm including its covering) which is not illustrated. Therefore, the power source 203 can apply voltage to the electrode 223 through the feeding line and the electrode press 222b.

The electrode guide holder 230 is fixed to the back plate 226 under the electrode holder 222. The electrode guide 231 is fixed to the electrode guide holder 230, and has an insertion hole into which the electrode 223 extending downward from the electrode press 222b is inserted. A position of the electrode 223 is set by making the electrode 223 to pass through the insertion hole.

Hereafter, an operation of the electric discharge machine 201 and a processing method using the electric discharge machine 201 are explained.

First, the work piece 224 is arranged on the XY stage 225. The work piece 224 of the present embodiment may be an object to be processed into a nozzle body of a fuel injection nozzle to inject fuel (gasoline fuel, diesel fuel, etc.) into a cylinder of an engine. The work piece 224 has an outer shape of the nozzle body. In the electric discharge machining using the electric discharge machine 201, a process of generating discharge between the electrode 223 and the work piece 224 so as to form a hole in the work piece 224 is repeated while the position of the stage 225 is suitably changed in the X-axis direction and the Y-axis direction. Therefore, plural holes for injecting fuel are formed at plural positions of the work piece 224. At this time, the work piece 224 is completed as the nozzle body, so that a method of processing the work piece 224 using electric discharging may also be a producing method of the nozzle body.

After the work piece 224 is arranged on the XY stage 225, an operator turns on the discharge power source 203. Then, the discharge power source 203 begins to impress pulse voltages between the electrode 223 and the work piece 224 with a predetermined period (for example, a period of several 10-millionth of a second).

Moreover, the operator turns on the discharge state detector circuit 204, the motor amplifier 205, and the controlling circuit 206. Then, the discharge state detector circuit 204 begins to output the discharge state signal which shows the discharge state (discharge current, discharge voltage, etc.) between the electrode 223 and the work piece 224 into the controlling circuit 206. Moreover, the controlling circuit 206 starts a position control processing in which an electrode drive signal is output into the motor amplifier 205 based on the received discharge state signal, in a manner that an interval between the electrode 223 and the work piece 224 becomes suitable for discharging. The motor amplifier 205 drives the ultrasonic motor 221 according to the electrode drive signal received from the controlling circuit 206.

Figure 15:
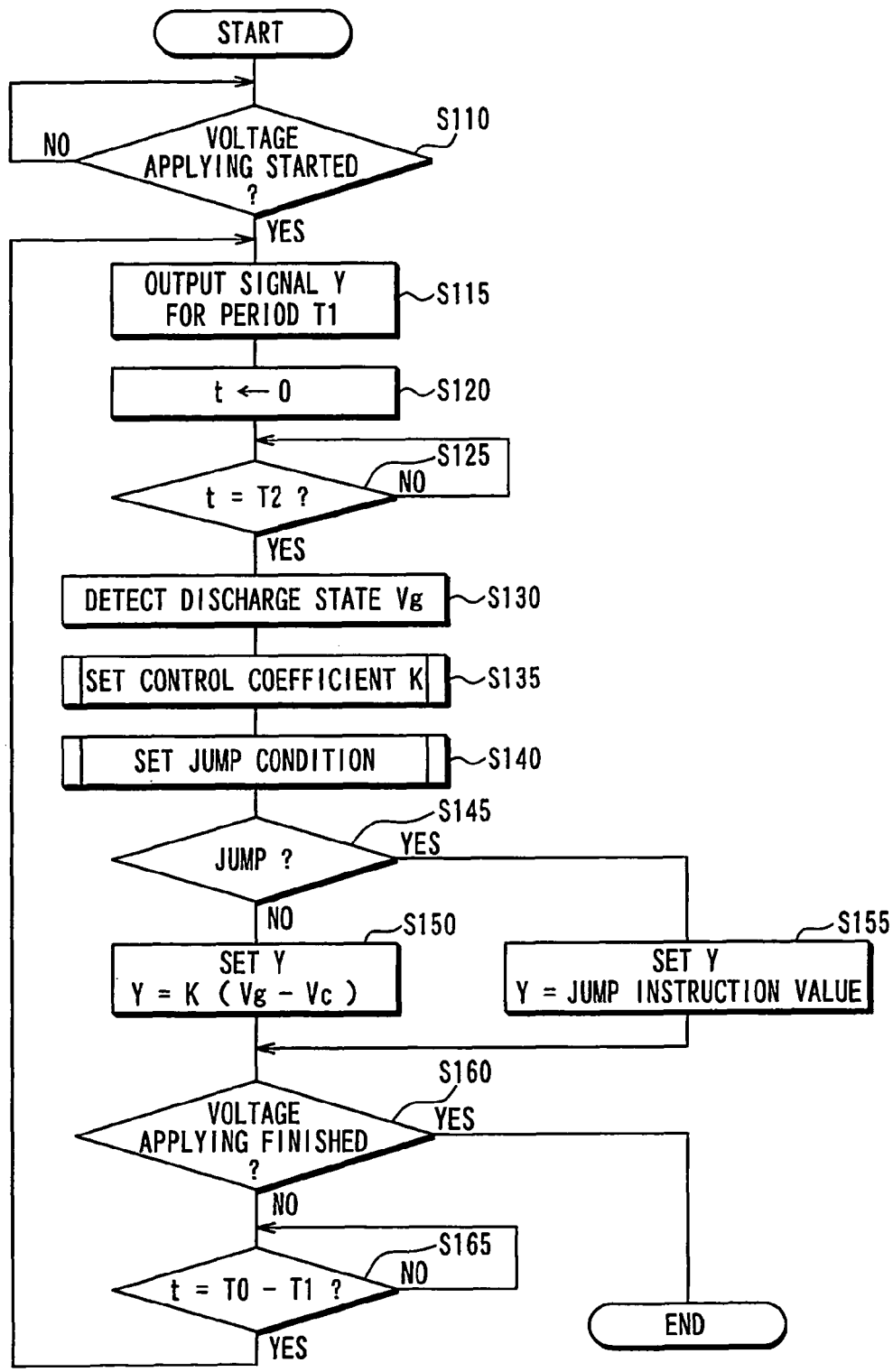
FIG. 15 is a flowchart illustrating a position control processing performed by a controlling circuit.
Figure 16:
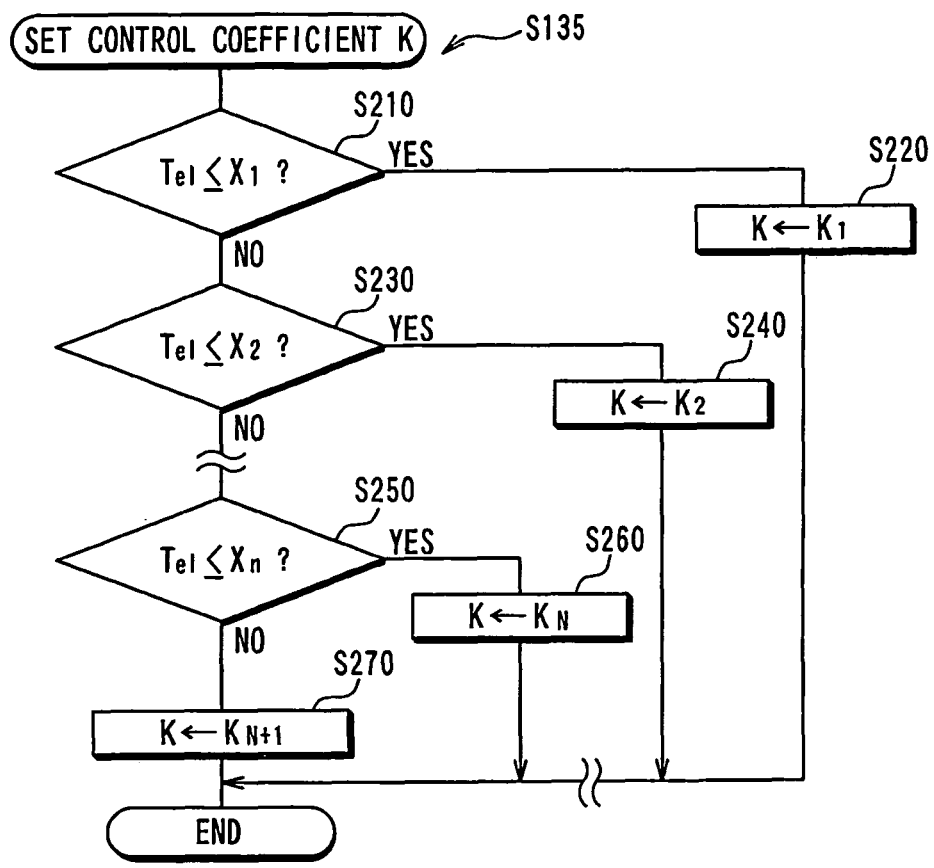
FIG. 16 is a flowchart illustrating a processing for setting a control coefficient K.
Figure 17:
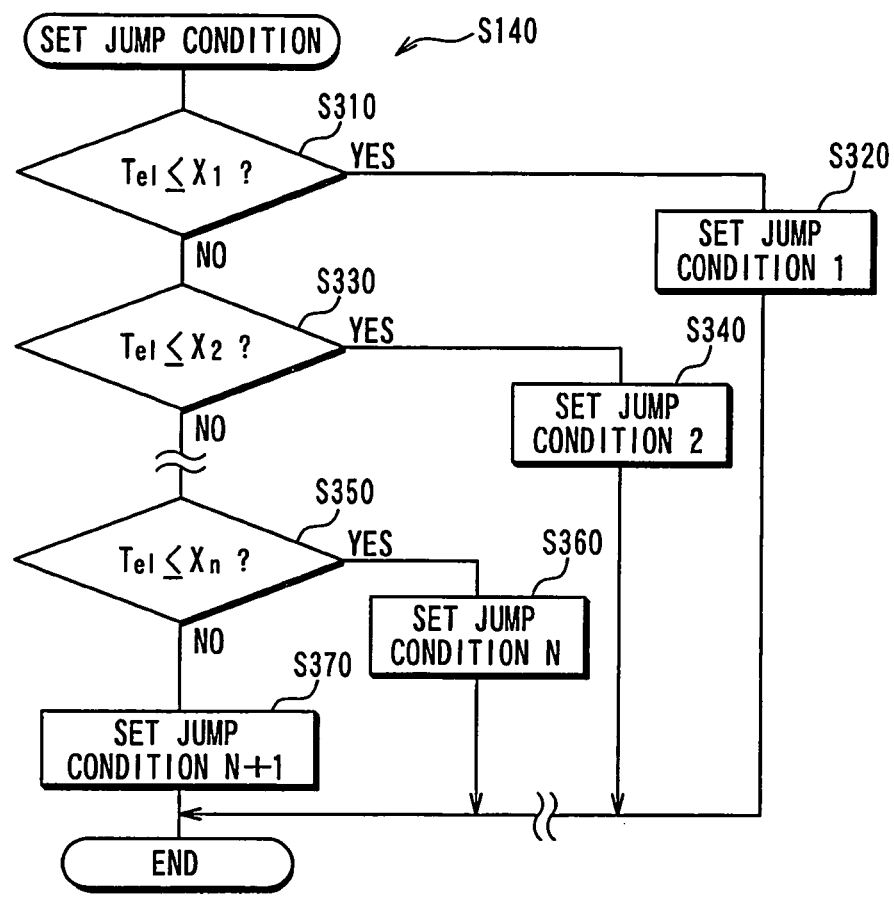
FIG. 17 is a flowchart illustrating a processing for setting a jump condition.

Details of the position control processing of the controlling circuit 206 are explained using FIGS. 15-18. FIG. 15 is a flow chart illustrating the position control processing performed by the controlling circuit 206. FIG. 16 is a flow chart illustrating a processing of setting a control coefficient K. FIG. 17 is a flow chart illustrating a processing of setting a jump condition. FIG. 18 is a timing chart which shows changes of the electrode drive signal, electrode position, discharge state, and discharge state detecting timing at the time of electric discharge processing.

At S110 of the position control processing, the controlling circuit 206 determines whether the power source 203 starts the applying of the pulse voltages based on the discharge state signal received from the detector circuit 204. S110 is repeated until the power source 203 is determined to start the applying of the pulse voltages, and S115 is performed when the power source 203 is determined to start the applying of the pulse voltages.

At S115, an electrode drive signal 251 (refer to FIG. 18) is continuously output into the motor amplifier 205 only for a predetermined period T1. A level Y of the electrode drive signal has a default value of Y0 (Y0 is a negative value) recorded in the ROM, immediately after the position control processing is started. In this example, the electrode drive signal having the default value Y0 is output into the motor amplifier 205 only for the predetermined period T1.

The motor amplifier 205 causes the elliptic motion of the finger chip 221a of the ultrasonic motor 221 with a speed proportional to an absolute value of the level. When the level of the electrode drive signal is positive, the elliptic motion makes the ceramic plate 222 to go up (namely, counterclockwise rotation in FIG. 13). When the level of the electrode drive signal is negative, the elliptic motion makes the ceramic plate 222 to go down (namely, clockwise rotation in FIG. 13). Because the level Y0 is a negative value, an electrode position 252 is lowered in the drive direction of the ceramic plate 222a and the electrode 223, so that the electrode 223 approaches the work piece 224 by a distance approximately proportional to the level Y0.

The discharge power source 203 repeatedly impresses pulse voltages between the electrode 223 and the work piece 224 while the electrode drive signal 251 is output. An interval T0 of the output timing of the electrode drive signal 251 is long compared with an interval of the impress timing of the pulse voltage. For example, pulse voltage is impressed about 10,000 times in the interval T0 of the output timing of the electrode drive signal 251. Every time when the pulse voltage is applied, discharge occurs with a discharge state 253 corresponding to a distance from the work piece 224 to the electrode 223 (discharge may not occur according to the distance etc.).

When the output of the electrode drive signal 251 for the period of T1 is completed, a timer value t is reset to zero at S120. The timer value t is increased in accordance with progress of time. The timer value t is waited for reaching a value of T2 at S125 (that is, the timer value t is waited until a timing 254a-254i comes when the period T2 is elapsed after the output of the signal 251 is finished). When the timer value t reaches the value of T2, S130 is performed. While the timer value t is waited for reaching the value of T2, the discharge power source 203 repeatedly impresses pulse voltages between the electrode 223 and the work piece 224, similarly to the period for which the electrode drive signal 251 is output.

While the timer value t is waited for reaching the value of T2, the motor amplifier 205 does not drive the ultrasonic motor 221, because the electrode drive signal 251 is not output into the motor amplifier 205. However, the moving speeds of the ceramic plate 222a and the electrode 223 do not necessarily become zero suddenly, due to inertia. The ceramic plate 222a and the electrode 223 are moved in the drive direction, in slowdown state by friction with the finger chip 221a. At this time, if the moving speed becomes zero before the period T2 passes, the moving speed is remained as zero when the period T2 is elapsed.

At S130, the present time discharge state 253 between the electrode 223 and the work piece 224 is detected based on the discharge state signal received from the discharge state detecting circuit 204, when the moving speed of the electrode 223 slows down to some extent. The present time discharge state 253 between the electrode 223 and the work piece 224 may be both or one of a discharge voltage Vg and a discharge current received from the circuit 204 at the present time, or may be both or one of an average value Vg of the discharge voltage and an average value of the discharge current for a predetermined period before the present time. The predetermined period is started when the output of the last signal 251 is finished (that is, at a timing that the electrode 223 starts deceleration). The predetermined period may be equal to or shorter than T2/2, for example, because the moving speed of the electrode 223 will be lowered enough after this period.

At S135, a control coefficient K (K is a positive value) is set. The discharge state detected at S130 has a gap relative to an ideal discharge state, and the control coefficient K represents a proportionality relationship between the gap of the discharge state and a level Y of the electrode drive signal 251 corresponding to the gap.

For example, a predetermined value Vc is set as an optimal discharge voltage of the ideal discharge state. The level Y of the electrode drive signal 251 to be output the next is computed using an equation Y=K(Vg−Vc) and the detected discharge voltage Vg.

As shown in FIG. 16, the control coefficient K is set based on an electrode lowering time Tel in the processing of setting the control coefficient K. The electrode lowering time Tel represents a value calculated by subtracting a sum of time taken for raising the electrode 223 from a sum of time taken for lowering the electrode 223, in a period started when the position control processing is started by the circuit 206 to the present time. A depth of the hole processed in the work piece 224 becomes larger, as the electrode lowering time Tel becomes longer.

More specifically, in a case where a time Xi is defined to become larger as a subscript i (i is a natural number equal to or smaller than N) becomes larger, the control coefficient K is set based on the present electrode lowering time Tel corresponding to the time Xi.

That is, when the electrode lowering time Tel is equal to or smaller than $X_1$ (S210), the control coefficient K is set as $K_1$ (S220). When the electrode lowering time Tel is larger than $X_1$ and is equal to or smaller than $X_2$ (S230), the control coefficient K is set as $K_2$ (S240). When the electrode lowering time Tel is larger than $X_{j-1}$ (j=3, 4, . . . , N−1) and is equal to or smaller than $X_j$, the control coefficient K is set as $K_j$. When the electrode lowering time Tel is larger than $X_{N-1}$ and is equal to or smaller than $X_N$ (S250), the control coefficient K is set as $K_N$ (S260). When the electrode lowering time Tel is larger than $X_N$ (S250), the control coefficient K is set as $K_{N+1}$ (S270). As the subscript i (i is a natural number equal to or smaller than N+1) becomes larger, an absolute value of K becomes larger.

The controlling circuit 206 increases the absolute value of the control coefficient K, as the electrode lowering time Tel becomes longer. A drive amount of the electrode 223 is made larger, as the absolute value of the control coefficient K becomes larger, even if the gap between the detected discharge state and the ideal discharge state is the same. Therefore, if the processing hole is made deep by the long electrode lowering time Tel, and if sludge (processing waste) generated by the processing becomes hard to be discharged from the hole, the sludge can be properly discharged from the hole due to the large displace amount of the electrode 223.

A jump condition is set at S140. A jump represents an operation for raising the electrode 223 so as to escape from the hole, so that the sludge generated in the hole can be quickly discharged.

A jump condition represents a condition to allow the jump to be performed. The controlling circuit 206 controls the electrode to have a jump at a timing that the jump condition is satisfied. One of the jump condition is that an execution period TJ of the jump comes, for example. Another of the jump condition is that a generation frequency of short circuit between the electrode 223 and the work piece 224 exceeds a threshold F.

As shown in FIG. 17, the jump condition is set based on the electrode lowering time Tel in the processing of setting the control coefficient K. More specifically, in the above case where the time Xi is defined to become larger as the subscript i becomes larger, the jump condition is set based on the present electrode lowering time Tel corresponding to the time Xi.

That is, when the electrode lowering time Tel is equal to or smaller than $X_1$ (S310), a jump condition 1 is set (S320). When the electrode lowering time Tel is larger than $X_1$ and is equal to or smaller than $X_2$ (S330), a jump condition 2 is set (S340). When the electrode lowering time Tel is larger than $X_{j-1}$ (j=3, 4, . . . , N−1) and is equal to or smaller than $X_j$, a jump condition j is set. When the electrode lowering time Tel is larger than $X_{N-1}$ and is equal to or smaller than $X_N$ (S350), a jump condition N is set (S360). When the electrode lowering time Tel is larger than $X_N$ (S350), a jump condition N+1 is set (S370). As the subscript i (i is a natural number equal to or smaller than N+1) becomes larger, the jump condition i becomes easy to be satisfied (frequency for satisfying the condition becomes large). For example, when the jump condition i is defined by using the above execution period TJ, the value of the execution period TJ becomes smaller, as the value of the subscript i becomes larger. When the jump condition i is defined by using the above threshold F, the value of the threshold F becomes smaller, as the value of the subscript i becomes larger.

The controlling circuit 206 makes the jump condition easy to be satisfied, as the electrode lowering time Tel becomes longer. Therefore, if the processing hole is made, deep by the long electrode lowering time Tel, and if sludge (processing waste) generated by the processing becomes hard to be discharged from the hole, the sludge can be properly discharged from the hole by increasing the frequency of the jump.

At S145, the jump is determined to be performed or not based on the jump condition set at S140. When the jump is determined not to be performed, S150 is performed. When the jump is determined to be performed, S155 is performed. In this example, S150 is performed because the jump condition is not satisfied immediately after the position control processing is started.

At S150, the level Y of the electrode drive signal 251 is set based on the discharge state detected at S130 and the control coefficient K set at S135. For example, the level Y is set using the equation Y=K(Vg−Vc). The level Y is set for an electrode drive signal 251 to be output the next.

At S160, the applying of the pulse voltage is determined to be finished or not. For example, the applying of the pulse voltage may be finished based on the discharge state signal output from the discharge state detector circuit 204 when the electrode 223 is determined to have penetrated the work piece 224. Alternatively, the applying of the pulse voltage may be finished based on a switch operation of a predetermined end switch performed by an operator. If the applying of the pulse voltage is determined not to be finished, S165 is performed. If the applying of the pulse voltage is determined to be finished, the electrode 223 is returned to an initial position so as to end the position control processing, so that the electric discharge processing is completed.

At S165, time is elapsed until the timer value t reaches a value of T0-T1. The electrode drive signal 251 is continued to be output during the time T1. Therefore, when the time. T0-T1 is elapsed after the output of the last signal 251 is finished, an output period T0 of the signal 251 is elapsed after the output of the last signal 251 is started. If time is elapsed until the timer value t reaches the value of T0-T1, S115 is performed again, so that a new signal 251 having the level Y set at S150 is output into the motor amplifier 205 only for the predetermined period T1.

A loop of S115-S165 is repeated. As shown in FIG. 18, the controlling circuit 206 outputs the electrode drive signal 251 with the predetermined period T0, so as to drive the electrode 223 (S115). When the predetermined time T2 is elapsed after the output of the electrode drive signal 251 is finished (S125), the discharge state is detected (S130). The level Y of the following electrode drive signal 251 is set based on the detected discharge state (S150), and the following electrode drive signal 251 (S165) is output as an electrode drive signal having the level Y. In addition, a period of detecting the discharge state of S130 is also set as T0.

If the jump condition is satisfied (S145), the level Y of the electrode drive signal 251 is set as a jump instruction value 251a at S155. The jump instruction value 251a is recorded in the ROM in advance in a manner that a jump can be performed by the electrode 223. S160 is performed after S155.

The controlling circuit 206 of this embodiment intermittently outputs the electrode drive signal 251 into the motor amplifier 205. The discharge state between the electrode 223 and the work piece 224 is detected at a timing after the output of the signal 251 (corresponding to a first electrode drive signal) is finished and before an output of the following signal 251 (corresponding to a second electrode drive signal) is started. A level of the following signal 251 is set in accordance with the detected discharge state.

Therefore, the discharge state is detected at a timing that the ultrasonic motor 221 to drive the electrode 223 is not operating, that is when the moving speed of the electrode 223 becomes smaller by inertia. Thus, the discharge state between the electrode 223 and the work piece 224 is detected when the electrode 223 is located near a position where the movement of the electrode 223 corresponding to the single signal 251 is finished (or is located at the position where the movement of the electrode 223 is finished).

The discharge state detected in such a position is very desirable for a feedback control to set the level Y of the following signal 251, because the electrode 223 will be further moved before the following signal 251 is output if the discharge state is detected in a state where the motor 221 continues operating by the output of the signal 251. In this case, accuracy of the detected discharge state is low as a feedback value.

The timing of detecting the discharge state is set after the output of the signal 251 is finished to stop the operation of the motor 221, and is set before an output of the following signal 251 is started to restart the operation of the motor 221, in the present embodiment. Therefore, accuracy of the feedback control of the electrode 223 using the detected discharge state becomes high.

Thus, accuracy of the position control of the electrode 223 can be made high. In a conventional motor-controlling technology, a first feedback control is performed to set a movement amount of the electrode 223 based on the discharge state, and a second feedback control is performed to detect an actual position of the electrode 223 using a rotary encoder, for example, so as to accurately realize the movement amount of the electrode 223. However, the second feedback control becomes unnecessary in the present embodiment.

Actually in this embodiment, while the ultrasonic motor 221 is operated by the controlling circuit 206, the motor 221 does not receive the feedback control of the detected position of the electrode 223.

The motor 221 is directly controlled without the second feedback control by eliminating a concept for controlling the position of the electrode 223. Therefore, the position of the electrode 223 is quickly controlled, so that a time necessary for the electric discharge processing is shortened.

The discharge state is detected by the circuit 206 at a timing when the predetermine time T2 is elapsed after the output of the signal 251 (corresponding to the first electrode drive signal) is finished so as to stop the operation of the motor 221. In a meaning for raising accuracy of the feedback control of the position of the electrode 223, the time T2 may be equal to or larger than ½ of a period defined to start when the output of the signal 251 (corresponding to the first electrode drive signal) is finished and to end when an output of the following signal 251 (corresponding to the second electrode drive signal) is started so as to restart the operation of the motor 221, because the electrode 223 will be decelerated enough as the time T2 is set longer. The ultrasonic motor 221 is used as a motor to move the electrode 223.

The ultrasonic motor 221 is a mechanism to move the electrode holder 222 using frictional force generated between the finger chip 221a and the electrode holder 222 (specifically, ceramic plate 222a). Therefore, it is not necessary to move a moving unit of a motor with the electrode holder 222 like a conventional motor (for example, linear motor) using change of magnetic field. That is, the ultrasonic motor 221 does not have a secondary moving unit of a motor (namely, component to move with the electrode holder 222 in the motor). In other words, a mass of the secondary moving unit is zero. Therefore, a mass of the electrode holder 222 can be reduced, so that high-speed movement and high-speed control are realized for the electrode 223. According to the present embodiment, a frequency for outputting the electrode drive signal 251 can be made 2-3 kHz, for example, although the frequency for outputting the electrode drive signal 251 is equal to or lower than 500 Hz in a conventional technology.

The ceramic plate 222a contacting the finger chip 221a of the ultrasonic motor 221 is used for holding the electrode. Therefore, a weight of the electrode holder 222 is made smaller, and insulation property of the ceramic plate 222a can be secured.

Moreover, in the present embodiment, the position control is performed only when the voltage is applied for the electric discharge processing (refer to S110 of FIG. 15). That is, the position control becomes effective only when the voltage is applied between the electrode 223 and the work piece 224. Therefore, useless position control is not performed.

Moreover, the processing for setting the control coefficient K and the processing for setting the jump condition are included in the same program as the position control of the electrode 223. The controlling circuit 206 integrally performs the processing for setting the control coefficient K, the processing for setting the jump condition, and the position control of the electrode 223.

The present invention is not limited by the present embodiment. Changes and modifications are to be understood as being within the scope of the present invention as defined by the appended claims.

For example, in the present embodiment, the control coefficient K and the jump condition are set based on the electrode lowering time Tel. However, the control coefficient K and the jump condition may be set based on an electrode lowering distance other than the electrode lowering time Tel. The electrode lowering distance represents a position of the electrode 223 at the present time relative to an initial position of the electrode 223 at the time of starting the position control of the controlling circuit 206. The depth of the hole processed in the work piece 224 becomes larger, as the electrode lowering distance becomes larger. In a case where the control coefficient K is set based on the electrode lowering distance, the electrode lowering time Tel of FIG. 16 is changed into the electrode lowering distance. In a case where the jump condition is set based on the electrode lowering distance, the electrode lowering time Tel of FIG. 17 is changed into the electrode lowering distance.

Moreover, the control coefficient K may be set based on a relationship between the discharge voltage Vg received from the discharge state detecting circuit 204 corresponding to the discharge state and a voltage Vc predetermined as an optimum value. Specifically, an absolute value of the control coefficient K is set larger in a case of Vg−Vc>0 rather than a case of Vg−Vc<0. In the case of Vg−Vc>0, the electrode 223 approaches the work piece 224 too much rather than a proper distance interval between the electrode 223 and the work piece 224. In such a case, the electrode 223 and the work piece 224 may have a fusion joining. Therefore, the electrode 223 is made to have a large movement so as to cancel the fusion joining.

Moreover, in the present embodiment, the time T2 is defined to start when the output of the signal 251 is completed so as to stop the operation of the motor 221 and to end when the discharge state is detected, and the time T2 is set constant. Alternatively, the time T2 may be varied.

For example, the time T2 may be varied in accordance with the absolute value of the coefficient K, while the coefficient K is changed as the processing is progressed in the present embodiment. This is because a time taken for sufficiently decelerating the electrode 223 after the ultrasonic motor 221 is stopped becomes long, as the movement amount of the electrode becomes large.

Moreover, for example, the time T2 may be set based on a last-detected discharge state. Because the moving speed of the electrode 223 is changed by the last-detected discharge state, the time taken for sufficiently decelerating the electrode 223 is also changed.

The second feedback control to detect the actual position of the electrode 223 with a rotary encoder etc. may be performed for the motor in the present embodiment. The effect of raising the position accuracy of the electrode 223 using the feedback control (first feedback control) based on the discharge state is shown even in such a case.

The controlling circuit 206 is not limited to set the level of the following signal 251 in accordance with the discharge state detected at the detection timing 254a-254i of FIG. 18, while the output time T1 of the single electrode drive signal 251 is set constant.

Alternatively, the controlling circuit 206 may set the output time of the following signal 251 in accordance with the discharge state detected at the detection timing 254a-254i of FIG. 18, while the level of the signal 251 is always set constant. In a viewpoint of the high-speed control, it is more advantageous to control the position of the electrode 223 by changing the level of the electrode drive signal. However, the purpose of the present invention is achieved also by controlling the output time of the electrode drive signal. Moreover, a deceleration degree of the electrode 223 becomes uniform after the output of the electrode drive signal is finished.

Further, a movement distance of the electrode 223 generated by the single signal 251 input into the ultrasonic motor 221 becomes larger, as an absolute value of an integral of the level of the signal 251 becomes larger, when the integral is calculated for the output time of the signal 251. Therefore, the controlling circuit 206 may only control the integral of the level of the signal 251 based on the detected discharge state. Furthermore, the controlling circuit 206 may control only an operation of the ultrasonic motor 221 to be performed the next based on the detected discharge state.

Moreover, in the present embodiment, each function realized by executing a program through the controlling circuit 206 may be realized using a hardware (for example, FPGA able to program the circuit composition) having those functions.

What is claimed is:

1. An electric discharge machine to process a work piece comprising:
    a plurality of electrodes to generate a plurality of discharges with the work piece, respectively, so as to process the work piece;
    a plurality of discharge power supply units to apply voltages for the plurality of electrodes, respectively, the discharge power supply units being independent from each other and operating separately from each other;
    a plurality of discharge head units; and
    a plurality of feeding lines, wherein
    the plurality of discharge head units have a plurality of drive mechanisms, respectively, to hold the corresponding one electrode and to change a position of the corresponding electrode, and have a plurality of conduction medium portions, respectively, to electrically connect the corresponding one discharge power supply unit to the corresponding electrode,
    each of the feeding lines electrically connects a connection terminal of the conduction medium portion of the corresponding one discharge head unit to a feeding terminal of the corresponding discharge power supply unit,
    the plurality of feeding lines have dimensions equal with each other,
    the feeding terminal and the connection terminal corresponding with each other, and the work piece are arranged on a straight line when seen from one direction of the electric discharge machine,
    the connection terminals of the plurality of discharge head units are arranged in equal intervals on a first circumference centering on a position of the work piece when seen from one direction of the electric discharge machine,
    the feeding terminals of the plurality of discharge power supply units are arranged in equal intervals on a second circumference centering on the position of the work piece when seen from the one direction of the electric discharge machine, and the second circumference is larger than the first circumference, and
    each of the plurality of electrodes has a contact point contact with the conduction medium portion of the corresponding discharge head unit, and distances from the contact points to ends of the electrodes adjacent to the work piece are approximately equal with each other.

2. The electric discharge machine according to claim 1, wherein:
    the plurality of discharge head units are arranged outside of a circle when the electric discharge machine is seen from a top side, the circle being defined to center on a position of the work piece and to have a radius corresponding to distances from holes to be processed in the work piece to the center when seen from one direction of the electric discharge machine.

3. The electric discharge machine according to claim 1, further comprising:
    a plurality of electrode guides, wherein
    the plurality of drive mechanisms respectively change the position of the corresponding electrode in a direction of a drive axis,
    each of the plurality of electrode guides is a hollow bar portion to guide a movement of the corresponding one electrode, and
    the drive axis of the drive mechanism of the discharge head unit, an axis of the corresponding electrode, and an axis of the corresponding electrode guide are coincident with each other.

4. The electric discharge machine according to claim 1, wherein:
    each of the plurality of drive mechanisms has an ultrasonic motor to drive the corresponding electrode.

5. The electric discharge machine according to claim 1, further comprising:
    a signal transmitter to send signals to the plurality of discharge power supply units, the signals indicating the plurality of discharge power supply units to apply voltages to the plurality of electrodes, respectively, at the same timing, wherein
    the signal transmitter causes the plurality of discharges to be simultaneously generated between the plurality of electrodes and the work piece.

6. The electric discharge machine according to claim 1, further comprising:
    a controller to stop one of the plurality of electrodes from moving when the one of the plurality of electrodes penetrates the work piece.

7. A method of producing a nozzle body of a fuel injection nozzle comprising:
    arranging a work piece to be processed into the nozzle body on an electric discharge machine according to claim 1; and
    processing a plurality of injection holes in the work piece using the electric discharge machine.

8. An electric discharge machine to process a work piece comprising:
    a plurality of electrodes to generate a plurality of discharges with the work piece, respectively, so as to process the work piece;
    a plurality of discharge power supply units to apply voltages for the plurality of electrodes, respectively, the discharge power supply units being independent from each other and operating separately from each other;
    a plurality of discharge head units; and
    a plurality of feeding lines, wherein
    the plurality of discharge head units have a plurality of drive mechanisms, respectively, to hold the corresponding one electrode and to change a position of the corresponding electrode, and have a plurality of conduction medium portions, respectively, to electrically connect the corresponding one discharge power supply unit to the corresponding electrode,
    each of the feeding lines electrically connects a connection terminal of the conduction medium portion of the corresponding one discharge head unit to a feeding terminal of the corresponding discharge power supply unit,
    the feeding terminal and the connection terminal corresponding with each other, and the work piece are arranged on a straight line when seen from one direction of the electric discharge machine, the connection terminals of the plurality of discharge head units are arranged in equal intervals on a first circumference centering on a position of the work piece when seen from one direction of the electric discharge machine, the feeding terminals of the plurality of discharge power supply units are arranged in equal intervals on a second circumference centering on the position of the work piece when seen from the one direction of the electric discharge machine, and the second circumference is larger than the first circumference, and respective impedances from one of the discharge power supply units to the electrically connected corresponding electrode are equal to each other.

* * * * *